(12) United States Patent
Watanabe et al.

(10) Patent No.: US 7,217,374 B2
(45) Date of Patent: May 15, 2007

(54) RESISTANCE ELEMENT, METHOD OF MANUFACTURING THE SAME, AND THERMISTOR

(75) Inventors: Miho Watanabe, Nakai-machi (JP); Masaki Hirakata, Nakai-machi (JP); Kazunori Anazawa, Nakai-machi (JP); Chikara Manabe, Nakai-machi (JP); Kentaro Kishi, Nakai-machi (JP); Taishi Shigematsu, Nakai-machi (JP); Takashi Isozaki, Nakai-machi (JP); Hiroyuki Watanabe, Nakai-machi (JP); Shigeki Ooma, Nakai-machi (JP); Shinsuke Okada, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 373 days.

(21) Appl. No.: 10/765,927

(22) Filed: Jan. 29, 2004

(65) Prior Publication Data
US 2005/0040371 A1  Feb. 24, 2005

(30) Foreign Application Priority Data
Aug. 22, 2003 (JP) ............................. 2003-299230

(51) Int. Cl.
*H01B 1/04* (2006.01)
*H01C 8/00* (2006.01)
*H01C 7/10* (2006.01)
*H01C 7/13* (2006.01)

(52) U.S. Cl. ........................ 252/502; 338/225; 338/20

(58) Field of Classification Search ................ 252/502, 252/500; 427/101; 338/22 R; 977/734, 977/742, 745
See application file for complete search history.

(56) References Cited

U.S. PATENT DOCUMENTS
6,203,814 B1 * 3/2001 Fisher et al. ................ 424/443
(Continued)

FOREIGN PATENT DOCUMENTS
JP    A 2002-110402    4/2002
(Continued)

OTHER PUBLICATIONS

GM Odegard et al., "Constitutive modeling of crosslinkked nanotube materials," 45th AIAA/ASME/AHS/ASC Structures, Structural Dynamics & Materials Conference, Apr. 19-22, 2004, Palm Springs, CA, pp. 1-13.*

(Continued)

*Primary Examiner*—Mark Kopec
*Assistant Examiner*—Jaison Thomas
(74) *Attorney, Agent, or Firm*—Oliff & Berridge, PLC

(57) ABSTRACT

To provide a resistance element having an electric resistance body with excellent stability and a method of manufacturing the same. The resistance element includes an electric resistance body, on a base body surface, consisting of a carbon nanotube structure layer 14, which configures a mesh structure in which at least plural carbon nanotubes are cross-linked to one another. The method of manufacturing the resistance element includes: an applying step of applying the base body surface 12 with a liquid solution containing carbon nanotubes having functional groups; and a cross-linking step of forming the carbon nanotube structure layer 14, used as an electric resistance body, that configures a mesh structure in which the plural carbon nanotubes are cross-linked to one another through curing of the liquid solution after application.

22 Claims, 13 Drawing Sheets

U.S. PATENT DOCUMENTS

| | | | |
|---|---|---|---|
| 6,531,513 B2 * | 3/2003 | Haddon et al. | 516/32 |
| 7,008,758 B2 * | 3/2006 | Park et al. | 430/325 |
| 2003/0086858 A1 * | 5/2003 | Niu et al. | 423/447.1 |
| 2005/0156504 A1 * | 7/2005 | Takai et al. | 313/495 |

FOREIGN PATENT DOCUMENTS

| WO | WO 97/32571 | 9/1997 |
|---|---|---|

OTHER PUBLICATIONS

A Kis et al., "Reinforcement of single-walled carbon nanotube bundles by intertube bridging," Nature Materials, vol. 3, Mar. 2004. pp. 153-157.*

Lyubchenko, Y.L. et al. "Atomic force microscopy of DNA and bacteriophage in air, water and propanol: the role of Adhesion forces." *Nucleic Acids Research*, 1993, vol. 21, No. 5, pp. 117-1123.

\* cited by examiner (a)

(b)

(c)

(d)

(e)

RESISTANCE ELEMENT, METHOD OF MANUFACTURING THE SAME, AND THERMISTOR

FIELD OF THE INVENTION AND RELATED ART STATEMENT

The present invention relates to a resistance element which uses a carbon nanotube structure as an electric resistance body, a method of manufacturing the same, and a thermistor.

Carbon nanotubes (CNTs), with their unique shape and characteristics, are being considered for various applications. Carbon nanotubes have a tubular shape of one-dimensional nature which is obtained by rolling one or more graphene sheets composed of six-membered rings of carbon atoms into a tube. Those that are formed from one graphene sheet are called single-wall nanotubes (SWNTs) while those that are formed from graphene sheet layers are called multi-wall nanotubes (MWNTs). SWNTs are about 1 nm in diameter whereas multi-wall carbon nanotubes measure several tens nm in diameter, and both are far thinner than their predecessors, which are called carbon fibers.

One of the characteristics of carbon nanotubes resides in that the aspect ratio of length to diameter is very large since the length of carbon nanotubes is on the order of micrometers. Carbon nanotubes are unique in their extremely rare nature of being both metallic and semi-conductive, owing to the fact that six-membered rings of carbon atoms in carbon nanotubes are arranged into a spiral. In addition, the electric conductivity of carbon nanotubes is very high and allows a current flow of 100 $MA/cm^2$ or more in terms of current density.

Carbon nanotubes excel not only in electrical characteristics but also in mechanical characteristics: distinct toughness, as attested by their Young's modulus exceeding 1 TPa, which belies their extreme lightness resulting from being formed solely of carbon atoms, and high elasticity and resiliency resulting from their cage structure. Having such various and excellent characteristics, carbon nanotubes are very appealing as industrial materials.

Applied researches that exploit the excellent characteristics of carbon nanotubes have been made extensively. To give a few examples, carbon nanotubes are added as a resin reinforcer or as a conductive composite material while another research utilizes carbon nanotubes as a probe of a scanning probe microscope. Carbon nanotubes have also been utilized as minute electron sources, field emission electronic devices, and flat displays. An application that is being developed is to use carbon nanotubes as a container for hydrogen storage.

Of those various applications of carbon nanotubes, applications as electronic materials and electronic devices are particularly attracting attention. Diodes, transistors, and other electronic devices that use carbon nanotubes have already been manufactured experimentally, and are expected to replace existing silicon semiconductor electronic devices.

For a resistance body used in an electric circuit, a carbon-coated resistor, a solid resistor, or the like is used conventionally. Problems of those resistance bodies include a large temperature coefficient, a large error in resistance values, and a large noise caused by a grain boundary surface of the resistance bodies.

Further, the resistance body is also used as a sheet heating element, which utilizes electrical-thermal energy conversion, such as an electric heating carpet and floor heating appliances. For such a heating element, a metal conductive resistance wire is conventionally used. In this case, a problem arises in that a weight of a product becomes extremely heavy because of a use of a metal wire. Further, the metal conductive resistance wire is liable to be damaged, causing local high temperature to suspend a normal heating function, which could become a cause of fire breaking.

Therefore, carbon nanotubes, which are chemically stable under high temperature, are used for a resistance body recently. For example, JP 2002-110402 A discloses a resistance body which includes a conductive powder (carbon nanotubes) dispersed in a binder resin. By changing a mixing ratio of the carbon nanotubes in the resin to change the resistance value, a heat value (resistance value) can be controlled.

In this case, a dispersing state of the carbon nanotubes in the resin becomes extremely important for maintaining a constant electric resistance value. However, a uniform dispersion of the carbon nanotubes in the binder resin is difficult, and the resistance value cannot be controlled with duplicability.

Further, as an application mode of the electric resistance body, a thermistor is given which uses temperature dependence of electric resistivity. The thermistor is widely used in industry such as in a temperature distribution measurement of an electric circuit board, a temperature measurement inside a copying machine, a medical thermistor temperature probe, a temperature probe for a petroleum vaporizer, a hot water temperature sensor for a water heater, a temperature sensor for a washing machine, and an air flow sensor, involving a substantial improvement on integration of the electrical circuit. However, a conventional thermistor, even a small one for a surface implementation, is thick with a thickness of about 0.5 mm. A development of a smaller and thinner thermistor is desired.

In an NTC thermistor widely used conventionally, metal oxides produced by sintering metal oxides of Mn, Ni, Co, Fe, Cu, and the like are mainly used, but a sintering temperature must be high in the production of the metal oxides. Further, a stable resistance value is hardly obtained with the resistance body that contains carbon nanotubes as a conductive material dispersed in the resin; therefore, such a resistance body was never used as a thermistor.

JP 2002-503204 A discloses a possible formation of carbon nanotubes which have three-dimensional structures using functionalized carbon nanotubes. However, the patent document discloses a carbon nanotube structure manufactured by bonding carbon nanotubes together using an alkoxide of aluminum or silica (the alkoxide itself becomes an insulator) as a cross-linking agent. However, as an application of the structure, in which the carbon nanotubes are bonded together, and an exhibition of practical conductivity using an alkoxide film, which may become an insulator and, of characteristics of the carbon nanotubes are not sufficiently examined.

SUMMARY OF THE INVENTION

As described above, a resistance element using conventional carbon nanotubes had a problem in that duplicability and stability thereof were low. Further, a configuration of a thermistor using the carbon nanotubes was not conceived.

The present invention has been made in view of the above circumstances and provides a resistance element having better duplicability and stability compared with a conventional carbon nanotube dispersion type resistance body and provides a thermistor using carbon nanotubes.

In order to solve the above problems, the resistance element of the present invention is characterized by including an electrical resistance body composed of a carbon nanotube structure having a mesh structure, in which plural carbon nanotubes are cross-linked to one another through cross-linked sites.

The inventors of the present invention have found out that the resistance value can be changed by changing a molecular structure of the cross-linked site where the carbon nanotubes are cross-linked together. Therefore, selecting a structure of the cross-linked site to form a carbon nanotube structure allows control of the resistance value to a prescribed resistance value.

Further, a stable patterning is possible; therefore, a resistance element having a desired resistance value can be obtained through a microfabrication of a coat.

For this reason, the resistance element of the present invention will not have an unstable resistance value due to unstable conditions of contact and alignment of the carbon nanotubes such as the case of using a simple dispersion film of carbon nanotubes for the electric resistance body. Therefore, a stable resistance element can be provided.

The carbon nanotube structure preferably has a cross-linked site formed by curing a liquid solution containing a cross-linking agent that prompts a cross-linking reaction between carbon nanotubes having a functional group and the functional group and by cross-linking the functional group of the carbon nanotubes and the cross-linking agent. The cross-linking agent is preferably a not self-polymerizable cross-linking agent at this time.

If the cross-linking agents have a property of prompting a polymerization reaction with one another (self-polymerizable) as a characteristic, the connecting group may contain a polymer, which has plural cross-linking agents per se randomly connected together. Therefore, a manufacture of a resistance body, which has a resistance value as desired, may be difficult.

On the other hand, if the cross-linking agent is not self-polymerizable, a gap between each of the carbon nanotubes can be controlled to a size of a cross-linking agent residue used. Therefore, a desired network structure of carbon nanotubes can be obtained with high duplicability. Further, by reducing the size of the cross-linking agent residue, a gap between each of the carbon nanotubes can be configured in an extremely close state electrically and physically. In addition, carbon nanotubes in the structure can be densely structured.

Therefore, if the cross-linking agent is not self-polymerizable, the carbon nanotube structure of the present invention can exhibit inherent electrical characteristics and physical characteristics of the carbon nanotubes in an extremely high level. As a result, a resistance body which has a prescribed resistance value can be prepared. In the present invention, "self-polymerizable" refers to a property of which the cross-linking agents may prompt a polymerization reaction with one another in the presence of other components such as water or without the presence of other components. On the other hand, "not self-polymerizable" means without such a property.

If a not self-polymerizable cross-linking agent is selected, a cross-linked site, where carbon nanotubes are cross-linked to one another, in the coat of the present invention has primarily an identical cross-linking structure.

Examples of the functional group include —OH, —COOH, —COOR (R is a substituted or unsubstituted hydrocarbon group), —COX (x is a halogen atom), —NH$_2$, and —NCO. A selection of at least one functional group selected from the above group is preferable, and in such a case, a cross-linking agent, which may prompt a cross-linking reaction with the selected functional group, is selected.

Further, examples of the preferable cross-linking agent include polyol, polyamine, polycarboxylic acid, polycarboxylate, polycarboxylic acid halide, polycarbodiimide, and polyisocyanate. A selection of at least one cross-linking agent selected from the above group is preferable, and in such a case, a functional group, which may prompt a cross-linking reaction with the selected cross-linking agent, is selected.

At least one functional group and one cross-linking agent are selected respectively from the group exemplified as the preferable functional group and the group exemplified as the preferable cross-linking agent, so that a combination thereof may prompt a cross-linking reaction with one another.

Examples of the particularly preferable functional group include —COOH and —COOR (R is a substituted or unsubstituted hydrocarbon group). Introduction of a carboxyl group to carbon nanotubes is relatively easy. Moreover, an obtained substance (carbon nanotube carboxylic acid) is highly reactive, easily prompts a cross-linking reaction by using a dehydration condensing agent such as N-ethyl-N'-(3-dimethylaminopropyl)carbodiimide, and is suitable for formation of a coat. Further, a conversion of a functional group of —COOH to —COOR (R is a substituted or unsubstituted hydrocarbon group) through esterification is relatively easy, and such functional group easily reacts in a cross-linking reaction and is suitable for formation of a coat.

Further, examples of the cross-linking agent corresponding to the functional group include polyol, polyamide, an ammonium complex, congo red, and Cisplatin. Those substances cure through a reaction with —COOR (R is a substituted or unsubstituted hydrocarbon group) or —COOH to easily form a strong cross-linked body.

Polyol is particularly desirable owing to its easiness of handling and small effect on the environment. Further, polyols such as glycerin, ethylene glycol, butenediol, hexynediol, hydroquinone, and naphthalenediol are preferable because of their not-oversized molecules preventing the carbon nanotube structure from becoming an insulator and of a relative conductivity enabling a use of the structure as an electric resistance element.

Further, a mode of forming the cross-linked site through chemical bonding plural functional groups together without using a cross-linking agent is also preferable. A structure of the carbon nanotube structure is stable in this case, similar to the case of forming the cross-linked site through a cross-linking agent, thus enabling stable characteristics.

A reaction forming such a chemical bond is preferably one reaction selected from the group consisting of a dehydration condensation, a substitution reaction, an addition reaction, and an oxidative reaction, from a view of enabling a bonding reaction among functional groups while circumventing an effect to the carbon nanotubes per se.

Further, the cross-linked site, where plural carbon nanotubes cross-link to one another, has preferably one structure selected from the group consisting of —COOCO—, —O—, —NHCO—, —COO—, —NCH—, —NH—, —S—, —O—, —NHCOO—, and —S—S—. A carbon nanotube structure having a cross-linked site of above structure exhibits prescribed electric conductivity because a length of the cross-linked site is sufficiently short and do not become a perfect insulator, thus can be used as an electric resistance body.

Plural carbon nanotubes, which configure a carbon nanotube structure, are more preferably multi-wall carbon nanotubes. The carbon nanotube structure can configure single-wall carbon nanotubes. However, a maximum current passed through the single-wall carbon nanotubes is small, leading to a gradual cutting of the nanotubes if continuously used without sufficient passivation and to a risk for the resistance body to become highly resistant. With the multi-wall carbon nanotubes, a larger current can be applied, thus enabling the resistance body to be continuously used with stability.

A method of manufacturing the resistance element of the present invention is characterized by including the steps of:

supplying a base body surface with a liquid solution containing plural carbon nanotubes that have functional groups bonded thereto (hereinafter, may simply referred to "cross-linking application liquid"); and cross-linking the plural carbon nanotubes to one another through chemical bonding the plural functional groups together to configure a mesh structure, thereby forming a carbon nanotube structure layer, which is used as an electrical resistance body.

A carbon nanotube structure, which configures a mesh structure of plural carbon nanotubes cross-linked to one another, is formed by supplying a base body surface with a liquid solution containing plural carbon nanotubes having functional groups bonded thereto and curing a coat after applying the liquid solution in a cross-linking step. The carbon nanotube structure is used as an electric resistance body. By going through the two steps, a structure per se of the carbon nanotube structure can be stabilized on the base body surface.

Further, changing a supplying step to an applying step, in which a cross-linking application liquid is applied to a base body surface, is preferable from a view of enabling an easy formation of a coat of a carbon nanotube structure on a whole surface or a part of the surface of the base body.

Further, a patterning step is preferably provided for patterning the carbon nanotube structure layer to a pattern corresponding to an electric resistance body. At this stage, the structure per se of the carbon nanotube structure layer is already stabilized in the cross-linking step. The patterning is performed with this state; therefore, there is no concern for a problem such as scattering of carbon nanotubes in the patterning step to arise, thus enabling patterning of the carbon nanotube structure layer to a pattern corresponding to an electric resistance body. Further, a film per se of the carbon nanotube structure layer is structured; therefore, a connection between the carbon nanotubes with one another is assuredly secured, enabling formation of a resistance element using carbon nanotubes.

As the patterning step, the following two Modes A and B can be given.

In Mode A, dry etching is performed on a region of the carbon nanotube structure layer on the base body surface without a pattern corresponding to the electric resistance body, thus removing the carbon nanotube structure layer from the region and patterning the carbon nanotube structure layer to a pattern corresponding to the electric resistance body.

As a process of patterning the carbon nanotube structure layer to a pattern corresponding to the electric resistance body, a mode, in which the patterning step is further divided into two steps, i.e., a resist layer forming step and a removing step, can be given. In the resist layer forming step, a resist layer (preferably, resin layer) is provided above a region of the carbon nanotube structure layer on the base body surface with a pattern corresponding to the electric resistance body. In a removing step, dry etching is conducted (preferably, by irradiating a radical of an oxygen molecule. The radical of an oxygen molecule is generated by irradiating an oxygen molecule with an ultraviolet ray, and this radical can be used) on a base body surface, where the carbon nanotube structure layer and the resist layer are layered, to remove an expressed region of the carbon nanotube structure layer other than the patterned region corresponding to the electric resistance body. In this case, by further including a resist layer peeling step to peel the resist layer provided in the resist layer forming step successively after the removing step, the patterned carbon nanotube structure layer can be expressed.

Further, in this mode, as another process of patterning the carbon nanotube structure layer to a pattern corresponding to the electric resistance body, a mode can be given of selectively irradiating a region of the carbon nanotube structure layer on the base body surface without a pattern corresponding to the electric resistance body with an ion of a gas molecule through an ion beam, thus removing the carbon nanotube structure layer from the region and patterning the carbon nanotube structure layer to a pattern corresponding to the electric resistance body.

The Mode B includes the resist layer forming step of providing a resist layer above a region of the carbon nanotube structure layer patterned corresponding to the electric resistance body at the base body surface, and the removing step of removing an expressed region of the carbon nanotube structure layer other than the patterned region by wetting the base body surface of the carbon nanotube structure layer and the resist layer with an etchant.

In a method of manufacturing a resistance element of the present invention, a preferable first method of chemically bonding plural functional groups together is a method in which the liquid solution contains a cross-linking agent to cross-link plural functional groups together.

It is particularly preferable to use a not self-polymerizable cross-linking agent for the cross-linking agent. If a self-polymerizable cross-linking agent is used as the cross-linking agent, the cross-linking agents may prompt a polymerization reaction with one another during or before a cross-linking reaction in the cross-linking step. Then, a bond between the cross-linking agents randomly becomes large and long, and a gap per se between each carbon nanotubes that bond to the crosslinking agents inevitably becomes widely spaced. In this case, a control of a reaction degree of self-polymerization of the cross-linking agents is actually difficult. Therefore, a cross-linking structure among the carbon nanotubes becomes uneven corresponding to a fluctuation in a polymerization state among the crosslinking agents.

However, by using a not self-polymerizable cross-linking agent, the cross-linking agents do not polymerize together at least during or before the cross-linking step. A residue from one cross-linking reaction of the cross-linking agent is involved as a connecting group among residues remaining after the cross-linking reaction of the functional group at the cross-link site among the carbon nanotubes. As a result, the obtained carbon nanotube structure layer has a uniform characteristic as a whole. In addition, a fluctuation in characteristics of the carbon nanotube structure layer after patterning can be substantially reduced when patterning the layer in the patterning step.

Further, if the cross-linking agents do not cross-link together, multiple types of not self-polymerizable cross-linking agents can be mixed and the carbon nanotubes can be cross-linked together with multiple types of cross-linking agents to control the gap between the carbon nanotubes. Therefore, a similar effect of reducing a fluctuation can be obtained. On the other hand, when cross-linking using a cross-linking agent different stepwise, a self-polymerizable cross-linking agent or a cross-linking agent, which cross-links to an initial cross-linking agent (or residue thereof), may be used in the cross-linking step if a not self-polymerizable cross-linking agent is used in the initial stage of the cross-linking step. The above is because a skeleton of a mesh structure of the carbon nanotubes is formed in a state in which a length between the carbon nanotubes is controlled.

Further, in a method of manufacturing a resistance element of the present invention, a preferable second method of forming a cross-linked site is a method of chemically bonding plural functional groups together.

From the above, a size of the cross-linked site, which bonds the carbon nanotubes together, becomes constant depending on the functional group to bond. A carbon nanotube has an extremely stable chemical structure, so that a possibility of bonding of functional groups or the like, other than the functional groups intended for a modification, is low. When chemically bonding the functional groups together, a structure of the designed cross-linked portion can be obtained, providing a homogeneous carbon nanotube structure. As a result, the obtained resistance body can be stable and homogeneous.

Further, functional groups are chemically bonded together and thus a length of the cross-linked portion between the carbon nanotubes can be shortened compared to the case of cross-linking the functional groups together using a cross-linking agent. Therefore, the carbon nanotube structure becomes dense, and a fluctuation in resistance inside the structure becomes small.

Examples of a particularly preferable reaction, which chemically bonds the functional groups together, include a condensation reaction, a substitution reaction, an addition reaction, and an oxidative reaction.

In a method of manufacturing a resistance element of the present invention, the preferable functional group includes: at least one functional group selected from the group consisting of —COOR (R is a substituted or unsubstituted hydrocarbon group), —COOH, —COX (X is a halogen atom), —OH, —CHO—, and —$NH_2$ for the condensation reaction; at least one functional group selected from the group consisting of —$NH_2$, —X (X is a halogen atom), —SH, —OH, —$OSO_2CH_3$, and —$OSO_2(C_6H_4)CH_3$ for the substitution reaction; at least one functional group selected from the group consisting of —OH and —NCO for the addition reaction; and —SH for the oxidative reaction.

In a method of manufacturing a resistance element of the present invention, a molecule containing the functional groups may be bonded to carbon nanotubes to be chemically bonded as the exemplified functional group portion to configure the cross-linked site.

If the reaction is a dehydration condensation, a condensing agent is preferably added. Further, the preferable functional group is at least one functional group selected from the group consisting of —COOR (R is a substituted or unsubstituted hydrocarbon group), —COOH, —COX (X is a halogen atom), —OH, —CHO, and —$NH_2$.

As the functional group specifically used for the condensation reaction, —COOH is particularly preferably used. Introduction of a carboxyl group to carbon nanotubes is relatively easy. Moreover, an obtained substance (carbon nanotube carboxylic acid) is highly reactive. Therefore, introduction of functional groups for forming a mesh structure to multiple places of one carbon nanotube is easy. In addition, the functional group easily reacts in a condensation reaction, thus being suitable for a formation of the carbon nanotube structure.

Further, through the steps of inventing the resistance element of the present invention, the inventors of the present invention have newly found out that the resistance element can be used as a thermistor. Plural carbon nanotubes are cross-linked to one another through a cross-linked site to configure a mesh structure, and the carbon nanotube structure having a temperature dependence of a prescribed electrical resistivity can be used as a thermistor base.

The prescribed electrical resistivity here is required for the following reasons. A temperature dependence of electrical resistivity differs depending on a measurement temperature range and a maximum power of the applied power source. As a result, a suitable carbon nanotube structure, that is, a structure of the cross-linked site also differs. For example, when using a voltage source of the same maximum current output, comparing a case of setting a measurement object to a temperature range of 0 to 100° C. and a case of setting a measurement object to a temperature range of 0 to 500° C., a resistance element with a higher temperature change rate can be selected for the former. Therefore, a carbon nanotube structure may be suitably selected according to an application.

Further, for a structure of the thermistor, when using the carbon nanotube structure, which has a mesh structure formed from a cross-linked site of the present invention, as a thermistor base, easy and stable coating is possible, and patterning through a printing method and patterning through etching are possible. Therefore, it is more suitable to configure a chip NTC (Negative Temperature Coefficient: having a negative resistance characteristic of lowering resistivity as the temperature rises). A single-wall type and multi-wall type can be used for a chip type. The single-wall type has two electrodes formed on the thermistor base, and the multi-wall type further has an inner electrode formed thereon.

BRIEF DESCRIPTION OF THE DRAWINGS

Preferred embodiments of the present invention will be described in detail based on the following figures, wherein.

DETAILED DESCRIPTION OF THE PREFERRED EMBODIMENT

Hereinafter, description of the present invention will be of a resistance element and a method of manufacturing the same, separately.

[Resistance Element]

An electric resistance element is known in the art, and there is no need for detailed description thereof. However, a resistance element of the present invention has such a feature that the electric resistance body configures a carbon nanotube structure. The carbon nanotube structure has a mesh structure in which plural carbon nanotubes are cross-linked to one another through plural cross-linked sites. Various examples of the resistance element include: one provided by fixing two lead wires to a resistance body; one enabling a variable resistance value by bringing a sliding electrical contact in contact with the resistance element; and one without particularly providing a lead wire by fixing the resistant element on an electrode of a substrate using solder. The resistance element of the present invention embraces the above.

Figure 1:
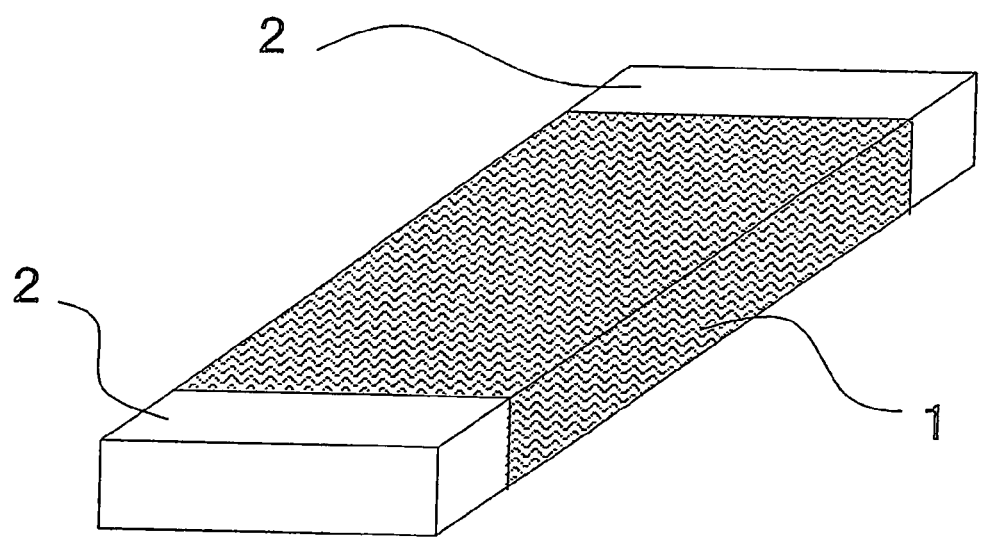
FIG. 1 shows a schematic diagram of a resistance element of the present invention.

FIG. 1 shows an example of a configuration of the resistance element. The resistance element of the example configures a carbon nanotube structure 1 in which plural carbon nanotubes are mesh-structured through cross-linked sites, and is configured by connecting electrodes 2 on both sides of the carbon nanotube structure.

The resistance element of an embodiment mode of the present invention has an electric resistance body configured with a carbon nanotube structure having a mesh structure in which plural carbon nanotubes are cross-linked to one another. Therefore, the resistance element will not have an unstable resistance value due to unstable conditions of contact and alignment of the carbon nanotubes such as the case of using a simple dispersion film of carbon nanotubes as an electric resistance body. Therefore, a stable resistance element can be provided.

When patterning of the carbon nanotube structure to a prescribed shape is required, examples of patterning include a case of enabling a direct patterning of the carbon nanotube structure layer at a base body surface according to a base body, a case of fixing the patterned carbon nanotube structure layer to a second base body along with a supporting base body and using, and a case of transferring the patterned carbon nanotube structure layer alone.

The resistance element of the present invention, particularly, can be easily manufactured as described later even when a substrate having flexibility and plasticity is used as a base body. In addition, the carbon nanotube structure layer formed on the surface has a cross-linking structure. Therefore, a risk of the carbon nanotube structure layer at the surface from breaking is small even when the substrate is deformed by bending, and deterioration of performance due to deformation is reduced. When used as a resistance element, in particular, increase of a resistance value caused by disconnection due to bending is reduced. Examples of the substrate having flexibility and plasticity include various resins such as polyethylene, polypropylene, polyvinyl chloride, polyamide, and polyimide.

<Carbon Nanotube Structure>

In the present invention, "carbon nanotube structure" refers to a configuration having a mesh structure in which plural carbon nanotubes are cross-linked to one another. As long as a layer of carbon nanotubes can be formed to configure a mutually cross-linked mesh structure, the carbon nanotube structure may be formed through any method. However, with a structure manufactured through a method of manufacturing a resistance element of the present invention described later, a low-priced and high performance electric resistance body can be easily manufactured and obtained, and an easy uniformization or control of characteristics is also easy.

A first structure of the carbon nanotube structure used as an electric resistance body in the resistance element of the present invention manufactured through a method of manufacturing a resistance element of the present invention described later is obtained through the steps of:

curing a solution liquid containing carbon nanotubes that have a functional group, and a cross-linking agent that prompts a cross-linking reaction with the functional group (cross-linking application liquid); and forming a cross-linked site through a cross-linking reaction of the functional group, which the carbon nanotubes have, and the cross-linking agent. Further, a second structure of the present invention is obtained by forming the cross-linked site through chemical bonding the functional groups of the carbon nanotubes together.

<Base Body>

In the present invention, the term base body means an object where a carbon nanotube structure is formed. A base body is a member supplied with a liquid solution in which carbon nanotubes modified with functional groups are mixed with a necessary additive in order to form a carbon nanotube structure. A base body may be like a mold which is separated from the carbon nanotube structure after formation of the carbon nanotube structure is completed, or may serve as a substrate constituting a part of a device that uses the carbon nanotube structure. In the present invention, a base body is not limited to a flat shape but can have any surface shape including spherical, curved, convexed or concaved, and amorphous.

When forming a carbon nanotube structure into a layer, the shape of a base body determines a course to take. If the shape of a base body allows, a carbon nanotube structure layer can be patterned directly on a surface of the base body. If not, a base body and a patterned carbon nanotube structure layer carried on the base body are together pasted onto a second base body, or the patterned carbon nanotube structure layer alone is transferred to the second base body. (Those are examples and there are other courses though not described here.)

There is no particular limitation on material of a base body. In addition to various materials conventionally used in substrates of electronic devices (such as a silicon wafer or a zinc oxide substrate), a diversity of resin materials and inorganic materials can be used for a base body without a problem. In general, a substrate having an insulating surface is chosen as a base body. However, a base body that is not insulative (a conductive or semi-conductive base body) may be employed depending on the function of a carbon nanotube structure layer to be formed.

In particular, a carbon nanotube structure of the present invention can be manufactured with ease even when a base body is a plastic or flexible substrate as will be described later. In addition, even if this substrate is bent and deformed, the risk of breaking a carbon nanotube structure layer that is formed on a surface of the substrate is small because of the cross-linking structure of the carbon nanotube structure layer. Thus, degradation of the performance of a device that uses the carbon nanotube structure due to the deformation is prevented. Also, chemical bonding between functional groups in the carbon nanotube structure makes characteristics of the carbon nanotube structure homogeneous. Examples of plastic or flexible substrates include substrates formed from various resins such as polyethylene, polypropylene, polyvinyl chloride, polyamide, and polyimide.

<Carbon Nanotube Structure Layer>

In the present invention, the term carbon nanotube structure layer means a layer in which plural carbon nanotubes constitute a mesh structure by being chemically bonded to one another through cross-linked sites formed from chemical bonds between plural functional groups that are bonded, at least on one end, to different carbon nanotubes out of the plural carbon nanotubes. Any method can be employed to form a carbon nanotube structure layer as long as the method is capable of forming a layer of carbon nanotubes that constitute a mesh structure by being cross-linked to one another through chemical bonding between functional groups. However, a carbon nanotube structure manufacturing method of the present invention which is described later is preferable since the manufacture is easy with the method. This manufacturing method is also capable of providing at low cost a high performance carbon nanotube structure whose characteristics are easy to control and uniformize.

The carbon nanotube structure layer manufactured by the carbon nanotube structure manufacturing method of the present invention, which is described later, to be used as a carbon nanotube structure of the present invention is formed by curing a liquid solution (cross-linking application liquid) that contains carbon nanotubes having functional groups and, if necessary, an additive for forming chemical bonds between the functional groups. As the liquid solution is cured, the functional groups of the carbon nanotubes react with one another to form cross-linking sites.

The carbon nanotube structure layer of the resistance element of this example is described below with reference to an example in which the carbon nanotube structure manufacturing method of the present invention is employed. If not particularly described, any structure of the cross-linked site may be adapted for the item.

(Carbon Nanotube)

Carbon nanotubes, which are the main component in the present invention, may be single-wall carbon nanotubes or multi-wall carbon nanotubes having two or more layers. Whether one or both types of carbon nanotubes are used (and, if only one type is to be used, which type is chosen) is decided appropriately taking into consideration the use of the resistance element or the cost.

Carbon nanotubes in the present invention include ones that are not exactly shaped like a tube, such as a carbon nanohorn (a horn-shaped carbon nanotube whose diameter is continuously increased from one end toward the other end) which is a variant of a single-wall carbon nanotube, a carbon nanocoil (a coil-shaped carbon nanotube forming a spiral when viewed in entirety), a carbon nanobead (a spherical bead made of amorphous carbon or the like with its center pierced by a tube), a cup-stacked nanotube, and a carbon nanotube with its circumference covered with a carbon nanohorn or amorphous carbon.

Furthermore, carbon nanotubes in the present invention may be ones that contain some substance inside, such as a metal-containing nanotube which is a carbon nanotube containing metal or the like, and a peapod nanotube which is a carbon nanotube containing a fullerene or a metal-containing fullerene.

As described above, the present invention can employ carbon nanotubes of any mode, including common carbon nanotubes, variants of common carbon nanotubes, and carbon nanotubes with various modifications, without a problem in terms of reactivity. Therefore, the concept of carbon nanotube in the present invention encompasses all of the above.

These carbon nanotubes are conventionally synthesized by a known method, such as arc discharge, laser ablation, and CVD, and the present invention can employ any of the methods. However, arc discharge in a magnetic field is preferable from the viewpoint of synthesizing a highly pure carbon nanotube.

Carbon nanotubes used in the present invention are preferably equal to and more than 0.3 nm and equal to or less than 100 nm in diameter. If the diameter of the carbon nanotubes exceeds this upper limit, the synthesis becomes difficult and costly. A more desirable upper limit of the diameter of the carbon nanotubes is 30 nm or less.

In general, the lower limit of carbon nanotube diameter is about 0.3 nm from a structural standpoint. However, too thin a diameter could lower the synthesis yield. It is therefore desirable to set the lower limit of carbon nanotube diameter to 1 nm or more, more desirably 10 nm or more.

The length of carbon nanotubes used in the present invention is preferably equal to or more than 0.1 µm and equal to or less than 100 µm. If the length of the carbon nanotubes exceeds this upper limit, the synthesis becomes difficult or requires a special method raising cost. On the other hand, if the length of the carbon nanotubes falls short of this lower limit, the number of cross-link bonding points per carbon nanotube is reduced, which is undesirable. A more desirable upper limit of carbon nanotube length is 10 µm or less and a more desirable lower limit of carbon nanotube length is 1 µm or more.

The appropriate carbon nanotube content in the cross-linking application liquid is varied depending on the length and thickness of carbon nanotubes, whether single-wall carbon nanotubes or multi-wall carbon nanotubes are used, the type and amount of functional groups in the carbon nanotubes, the type and amount of cross-linking agents or an additive for bonding functional groups together, whether there is a solvent or other additive used and, if one is used, the type and amount of the solvent or additive, etc. The carbon nanotube concentration in the liquid solution should be high enough to form an excellent coat by application and curing but not too high to make it difficult to apply the liquid.

Specifically, the ratio of carbon nanotubes to the entire application liquid excluding the mass of the functional groups is 0.01 to 10 g/l, desirably 0.1 to 5 g/l, and more desirably 0.5 to 1.5 g/l, although, as mentioned above, the ranges could be different if the parameters are different.

If the purity of carbon nanotubes to be used is not high enough, it is desirable to raise the purity by refining the carbon nanotubes prior to preparation of the cross-linking application liquid. In the present invention, the higher the carbon nanotube purity, the better the result can be. Specifically, the purity is desirably 90% or higher, more desirably, 95% or higher. When the purity is low, cross-linking agents are cross-linked to carbon products such as amorphous carbon and tar, which are impurities. This could change the cross-linking distance between carbon nanotubes, leading to a failure in obtaining desired characteristics. No particular limitation is put on how carbon nanotubes are refined, and any known refining method can be employed.

(Functional Group 1)

In the first method in which the cross-linked site formed using a cross-linking agent, carbon nanotubes can have any functional group as long as functional groups chosen can be added to the carbon nanotubes chemically and can prompt a cross-linking reaction with some cross-linking agent. Specific examples of such functional groups include —COOR, —COX, —MgX, —X (X represents halogen), —OR, —NR$^1$R$^2$, —NCO, —NCS, —COOH, —OH, —NH$_2$, —SH, —SO$_3$H, —R'CHOH, —CHO, —CN, —COSH, —SR, —SiR'$_3$ (R, R$^1$, R$^2$, and R' each represent a substituted or unsubstituted hydrocarbon group). Note that employable functional groups are not limited to those examples.

Of those, a selection of one functional group selected from the group consisting of —OH, —COOH, —COOR (R is a substituted or unsubstituted hydrocarbon group), —COX (X is a halogen atom), —NH$_2$, and —NCO is preferable. In that case, a cross-linking agent, which can prompt a cross-linking reaction with the selected functional group, is selected as the cross-linking agent.

The appropriate amount of functional groups introduced varies depending on the length and thickness of carbon nanotubes, whether single-wall carbon nanotubes or multi-wall carbon nanotubes are used, the type of functional groups, the use of resistance element obtained, etc. From the viewpoint of the strength of the cross-linked body obtained, namely, the strength of the coat formed by application, a preferable amount of functional groups introduced is large enough to add two or more functional groups to each carbon nanotube. How functional groups are introduced into carbon nanotubes will be explained in a section below titled [Method of Manufacturing a Resistance Element].

(Cross-linking Agent)

Any cross-linking agent, which is an essential ingredient of the cross-linking application liquid, that is capable of prompting a cross-linking reaction with the functional groups of the carbon nanotubes can be used. In other words, the types of cross-linking agents that can be chosen are limited to a certain degree by the types of the functional groups. Also, the condition of curing (heating, UV irradiation, irradiation of visible light, natural curing, etc.) as a result of the cross-linking reaction is naturally determined by the combination of those parameters.

Specific examples of the preferable cross-linking agents include polyol, polyamine, polycarboxylic acid, polycarboxylate, polycarboxylic acid halide, polycarbodiimide, and polyisocyanate. In that case, a functional group which can prompt a reaction with the cross-linking agent is selected as the functional group.

At least one functional group and one cross-linking agent are particularly preferably selected respectively from the group exemplified as the preferable functional group and the group exemplified as the preferable cross-linking agent, so that a combination thereof may prompt a cross-linking reaction with one another. The following Table 1 lists the combinations of the functional group of the carbon nanotubes and the corresponding cross-linking agent, which can prompt a cross-linking reaction, along with curing conditions of the combinations.

TABLE 1

| Functional groups of carbon nanotubes | Cross-linking agent | Curing condition |
|---|---|---|
| —COOR | polyol | heat curing |
| —COX | polyol | heat curing |
| —COOH | polyamine | heat curing |
| —COX | polyamine | heat curing |
| —OH | polycarboxylate | heat curing |
| —OH | polycarboxylic acid halide | heat curing |
| —NH$_2$ | polycarboxylic acid | heat curing |
| —NH$_2$ | polycarboxylic acid halide | heat curing |
| —COOH | polycarbodiimide | heat curing |
| —OH | polycarbodiimide | heat curing |
| —NH$_2$ | polycarbodiimide | heat curing |
| —NCO | polyol | heat curing |
| —OH | polyisocyanate | heat curing |
| —COOH | ammonium complex | heat curing |
| —COOH | Cisplatin | heat curing |

*R is a substituted or unsubstituted hydrocarbon group
*X is a halogen

Of those combinations, combinations of —COOR (R is a substituted or unsubstituted hydrocarbon group) and —COOH having satisfactory reactivity of a functional group side with polyol, polyamine, ammonium complex, congo red, and Cisplatin are suitable. "Polyol", "polyamine", and "ammonium complex" of the present invention are generic names of compounds having two or more OH groups, NH$_2$ groups, and ammonium groups.

From another perspective, the cross-linking agent is preferably a not self-polymerizable cross-linking agent. Examples of the polyols such as glycerin, ethylene glycol, butenediol, hexynediol, hydroquinone, and naphthalenediol are not self-polymerizable cross-linking agents. More generally, a prerequisite of the not self-polymerizable cross-linking agent is to be without a pair of functional groups, which can prompt a polymerization reaction to one another, in itself On the other hand, examples of a self-polymerizable cross-linking agent include one that has a pair of functional groups, which can prompt a polymerization reaction with one another (alkoxide, for example).

A content of the cross-linking agent in the solution obviously depends on: type of a cross-linking agent (including self-polymerizable or not self-polymerizable); as well as length and thickness, single-wall or multi-wall carbon nanotubes; type and amount of a functional group contained; and presence, type, and amount of a solvent or other additives; or the like, and cannot be simply determined. In particular, glycerin, ethylene glycol, or the like can be added excessively because a viscosity thereof is not very high and characteristics of the solvent can be combined with those of the cross-linking agent.

(Functional Group 2)

Further, in the second method of obtaining a mesh structure of mutually cross-linked carbon nanotubes, a cross-linked site of the carbon nanotube structure is formed by chemically bonding plural functional groups, in which at least one end of the cross-linked site is bonded to different carbon nanotubes respectively. In the second method, the functional group to be bonded to the carbon nanotubes can be chemically added to the carbon nanotubes. In addition, as long as reacting themselves with some additive, the functional group is not particularly limited, and any functional group can be selected. Specific examples of the functional group include —COOR, —COX, —MgX—, —X (X is a halogen), —OR, —NR$^1$R$^2$, —NCO, —NCS, —COOH, —OH, —NH$_2$, —SH, —SO$_3$H, —R'CHOH, —CHO, —CN, —COSH, —SR, —SiR'$_3$ (each of R, R$^1$, R$^2$, and R$^3$ independently is a substituted or unsubstituted hydrocarbon group), but are not limited to those.

Of those, the preferable functional group includes: at least one selected from the group consisting of —COOR (R is a substituted or unsubstituted hydrocarbon group), —COOH, —COX (X is a halogen atom), —OH, —CHO—, and —NH$_2$ for the condensation reaction; at least one selected from the group consisting of —NH$_2$, —X (X is a halogen atom), —SH, —OH, —OSO$_2$CH$_3$, and —OSO$_2$(C$_6$H$_4$)CH$_3$ for the substitution reaction; at least one selected from the group consisting of —OH and —NCO for the addition reaction; and —SH for the oxidative reaction.

Further, bonding a molecule, which partially contains those functional groups, with the carbon nanotubes to chemically bond at a preferable functional group portion exemplified above is also possible. Even in this case, a functional group with large molecular weight to be bonded to the carbon nanotubes is bonded as intended, enabling a control of a length of the cross-linked site.

(Additive)

Any additive that is capable of making the functional groups of the carbon nanotubes react to one another can be mixed in the cross-linking application liquid. In other words, the types of additives that can be chosen are limited to a certain degree by the types of the functional groups and the reaction type. Also, the condition of curing (heating, UV irradiation, irradiation of visible light, natural curing, etc.) as a result of the reaction is naturally determined by the combination of those parameters.

(Condensing Agent)

To give specific examples of preferable additives, an acid catalyst or a dehydration condensation agent, for example, sulfuric acid, N-ethyl-N'-(3-dimethylaminopropyl)carbodiimide, and dicyclohexyl carbodiimide, is preferred as a condensing agent. Desirably, at least one condensing agent is chosen from the group consisting of the above. The functional groups chosen have to react to one another with the help of the selected condensing agent.

(Base)

When a substitution reaction is to be utilized, a base is an indispensable component of the cross-linking application liquid. An arbitrary base is chosen in accordance with the degree of acidity of hydroxyl groups.

Preferably, the base is at least one chosen from the group consisting of sodium hydroxide, potassium hydroxide, pyridine, and sodium ethoxide. A substitution reaction is to take place among the functional groups with the help of the selected base.

It is particularly desirable to select a combination of functional groups such that at least two functional groups from each of the example groups that are given above as examples of preferable functional groups react to each other. Listed in Table 2 below are functional groups of carbon nanotubes and names of the corresponding reactions.

An addition reaction does not necessarily need an additive. In an oxidative reaction, an additive is not necessarily needed but adding an oxidative reaction accelerator is preferable. A specific example of the accelerator is iodine.

TABLE 2

| Bonding site | Functional group of carbon nanotubes (A) | Functional group of carbon nanotubes (B) | Reaction |
| --- | --- | --- | --- |
| —COOCO— | —COOH | — | Dehydration condensation |
| —S—S— | —SH | — | Oxidative reaction |
| —O— | —OH | — | Dehydration condensation |
| —NH—CO— | —COOH | —NH$_2$ | Dehydration condensation |
| —COO— | —COOH | —OH | Dehydration condensation |
| —COO— | —COOR | —OH | Dehydration condensation |
| —COO— | —COX | —OH | Dehydration condensation |
| —CH=N— | —CHO | —NH$_2$ | Dehydration condensation |
| —NH— | —NH$_2$ | —X | Substitution reaction |
| —S— | —SH | —X | Substitution reaction |
| —O— | —OH | —X | Substitution reaction |
| —O— | —OH | —OSO$_2$CH$_3$ | Substitution reaction |
| —O— | —OH | —OSO$_2$(C$_6$H$_4$)CH$_3$ | substitution reaction |
| —NH—COO— | —OH | —N=C=O | addition reaction |

*R is a substituted or unsubstituted hydrocarbon group
*X is a halogen (Other Additive)

The cross-linking application liquid may contain various additives including a solvent, a viscosity adjuster, a dispersant, and a cross-linking accelerator. A solvent is added when satisfactory application of the cross-linking application liquid is not achieved with solely the cross-linking agents and the additive for bonding the functional groups. Any solvent can be appropriately employed without particular limitation as long as it is suitable for the cross-linking agents and the additive for bonding functional groups used. Specific examples of employable solvents include: organic solvents such as methanol, ethanol, isopropanol, n-propanol, butanol, methyl ethyl ketone, toluene, benzene, acetone, chloroform, methylene chloride, acetonitrile, diethyl ether, tetrahydrofuran (THF); water; aqueous solutions of acids; and alkaline aqueous solutions. A solvent as such is added in an amount that is not particularly limited but determined appropriately by taking into consideration the ease of applying the cross-linking application liquid.

A viscosity adjuster is added when satisfactory application of the cross-linking application liquid is not achieved with solely the cross-linking agents and the additive for bonding the functional groups. Any viscosity adjuster can be appropriately employed without any limitation as long as it is suitable for the cross-linking agents and the additive for bonding and the functional groups used. Specific examples of employable viscosity adjusters include methanol, ethanol, isopropanol, n-propanol, butanol, methyl ethyl ketone, toluene, benzene, acetone, chloroform, methylene chloride, acetonitrile, diethyl ether, and THF.

Some of these viscosity adjusters obtain the function of a solvent when added in a certain amount, and it is meaningless to apparently discriminate viscosity adjusters from solvents. A viscosity adjuster as such is added in an amount that is not particularly limited but determined by taking into consideration the ease of applying the cross-linking application liquid.

A dispersant is added to the cross-linking application liquid in order to maintain the dispersion stability of the carbon nanotubes or the cross-linking agents or the additive for bonding and the functional groups in the application liquid. Various known surface-active agents, water-soluble organic solvents, water, aqueous solutions of acids, alkaline aqueous solutions, etc. can be employed as a dispersant. However, a dispersant is not always necessary since components of the coating material (cross-linking application liquid) of the present invention have high dispersion stability by themselves. In addition, depending on the use of the coat formed by applying the cross-linking application liquid, the presence of a dispersant and like other impurities in the coat may not be desirable. In such case, a dispersant is not added at all, or is added in a very small amount.

(Method of Preparing the Cross-linking Application Liquid)

A method of preparing the cross-linking application liquid is described next. The cross-linking application liquid is prepared by mixing, as needed, carbon nanotubes that have functional groups with a cross-linking agent that prompts a cross-linking reaction with the functional groups or an additive that causes the functional groups to form chemical bonds among themselves (mixing step). The mixing step may be preceded by an addition step in which the functional groups are introduced into the carbon nanotubes.

If carbon nanotubes having functional groups are starting material, the preparation starts with the mixing step. If normal carbon nanotubes themselves are starting material, the preparation starts with the addition step. The addition step is a step of introducing desired functional groups into carbon nanotubes. How functional groups are introduced is varied depending on the type of functional group. One method is to add a desired functional group directly, and another method is to introduce a functional group that is easy to attach and then substitute the whole functional group or a part thereof or attach a different functional group to the former functional group in order to obtain the objective functional group. Still another method is to apply a mechanochemical force to a carbon nanotube to break or alter only a small portion of a graphene sheet on the surface of the carbon nanotube and introduce various functional groups from the broken or altered portion.

Cup-stacked carbon nanotubes, which have many defects on the surface upon manufacture, and carbon nanotubes that are formed by vapor phase growth are relatively easy to introduce functional groups. On the other hand, carbon nanotubes that have a perfect graphene sheet structure exert the carbon nanotube characteristics more effectively and are easier to control the characteristics. Consequently, it is particularly desirable to use a multi-wall carbon nanotube so that defects formed as many as appropriate as an electric resistance body on its outermost layer are used to bond functional groups for cross-linking while the inner layers having less structural defects exert the carbon nanotube characteristics.

There is no particular limitation put on the addition step and any known method can be employed. Various addition methods disclosed in JP 2002-503204 A may be employed in the present invention depending on the purpose. A description is given on a method of introducing —COOR (R is a substituted or unsubstituted hydrocarbon group), a particularly desirable functional group among the functional groups listed in the above. To introduce —COOR (R is a substituted or unsubstituted hydrocarbon group) into carbon nanotubes, carboxyl groups may be (1) added to the carbon nanotubes once, and then (2) esterified.

(1) Addition of Carboxyl Group

To introduce carboxyl groups into carbon nanotubes, carboxyl groups are refluxed together with an acid having an oxidizing effect. This operation is relatively easy and is preferable since carboxyl groups which are rich in reactivity are attached to carbon nanotubes. A brief description of the operation is given below.

An acid having an oxidizing effect is, for example, concentrated nitric acid, hydrogen peroxide water, a mixture of sulfuric acid and nitric acid, or aqua regia. When concentrated nitric acid is used, in particular, the concentration is desirably 5 mass % or higher, more desirably, 60 mass % or higher.

A normal reflux method can be employed. The temperature is preferably set to a level near the boiling point of the acid used. When concentrated nitric acid is used, for instance, the temperature is preferably set to 120 to 130° C. The reflux desirably lasts 30 minutes to 20 hours, more desirably, 1 hour to 8 hours.

Carbon nanotubes to which carboxyl groups are attached (carbon nanotube carboxylic acid) are generated in the reaction liquid after the reflux. The reaction liquid is cooled down to room temperature and then receives a separation operation or washing as necessary, thereby obtaining the objective carbon nanotube carboxylic acid (carbon nanotubes having —COOH as functional groups).

(2) Esterification

The target functional group —COOR (R is a substituted or unsubstituted hydrocarbon group) can be introduced by adding an alcohol to the obtained carbon nanotube carboxylic acid and dehydrating for esterification.

The alcohol used for the esterification is determined according to R in the formula of the functional group. That is, if R is $CH_3$, alcohol is methanol, and if R is $C_2H_5$, alcohol is ethanol. A catalyst is generally used in the esterification, and a conventionally known catalyst such as sulfuric acid, hydrochloric acid, and toluenesulfonic acid can also be used in the present invention. A use of the sulfuric acid as a catalyst is preferable from a view of not prompting a side reaction in the present invention.

The esterification may be conducted by adding an alcohol and a catalyst to carbon nanotube carboxylic acid and refluxing at an appropriate temperature for an appropriate time period. A temperature condition and a time period condition depend on type of a catalyst, type of alcohol, or the like and cannot be simply determined, but a reflux temperature close to a boiling point of the alcohol used is preferable. A range of 60 to 70° C. is preferable for methanol, for example. Further, a time period is preferably in a range of 1 to 20 hours, more preferably in a range of 4 to 6 hours.

Carbon nanotubes with the functional group —COOR (R is a substituted or unsubstituted hydrocarbon group) added can be obtained by separating a reaction product from a reaction solution after esterification and washing as required.

The mixing step is a step of mixing, as required, a cross-linking agent prompting a cross-linking reaction with the functional groups or an additive for bonding the functional groups with the carbon nanotubes which contain functional groups (—COOH and —COOR) to prepare the cross-linking application liquid. In the mixing step, other components described in a section below titled [resistance element] are added, in addition to the carbon nanotubes containing functional groups and the cross-linking agents. Then, preferably, an amount of a solvent or a viscosity control agent is adjusted considering applicability to prepare the cross-linking application liquid just before application.

A simple stirring with a spatula and stirring with an agitator of an agitating blade type, a magnetic stirrer, and a stirring pump may be used. However, for more uniform dispersion of the carbon nanotubes to enhance storage stability and for fully extending a mesh structure by cross-linking of the carbon nanotubes, an ultrasonic disperser or a homogenizer may be used for powerful dispersion. However, when using a stirring device with a strong shear force of stirring, there arises a risk of cutting and damaging the carbon nanotubes contained, thus the device may be used for a very short time period.

A carbon nanotube structure layer is formed by applying the cross-linking application liquid described above to a base body surface and curing. An applying method and a curing method are described in detail in a section below titled [Method of Manufacturing a Resistance Element] described later.

The carbon nanotube structure layer of the present invention is in a state of carbon nanotubes being networked. More specifically, the carbon nanotube structure layer is cured in a matrix form, and the carbon nanotubes are connected together through a cross-linked site. Therefore, an electrical bond can be assuredly formed.

A thickness of the carbon nanotube structure layer can be widely selected from being very thin to being thick according to an application. Lowering a content of the carbon nanotubes in the solution used (simply, lowering the viscosity by diluting) and applying in a thin coat form allows to a very thin coat to be obtained. Similarly, raising a content of the carbon nanotubes allows a thick coat to be obtained. Further, repeating the application allows an even thicker coat to be obtained. Formation of a very thin coat from a thickness of about 10 nm is possible, and formation of a thick coat without an upper limit is possible through recoating. A possible coat thickness with one coating is about 2 µm. Further, a desired shape of the structure can be obtained by injecting the cross-linking application liquid, in which a content or the like is adjusted, to a mold and bonding.

In the carbon nanotube structure, when using the cross-linking agent of the first method, a site where the carbon nanotubes cross-link together, that is, the cross-linked site from a cross-linking reaction between the functional groups of the carbon nanotubes and the cross-linking agents has a cross-linking structure. In the cross-linking structure, residues of the functional group remaining after a cross-linking reaction are connected together with a connecting group, which is a residue of the cross-linking agent remaining after a cross-linking reaction.

As described, the cross-linking agent, which is a component of the cross-linking application liquid, is preferably not self-polymerizable. If the cross-linking agent is not self-polymerizable, the carbon nanotube structure layer finally manufactured would be configured from a residue of only one cross-linking agent. The gap between the carbon nanotubes to be cross-linked can be controlled to a size of a residue of the cross-linking agent, thereby providing a desired network structure of the carbon nanotubes with high duplicability. Further, multiple cross-linking agents are not present between the carbon nanotubes, thus enabling an enhancement of a substantial density of the carbon nanotubes in the carbon nanotube structure. Further, by reducing a size of a residue of the cross-linking agent, a gap between each of the carbon nanotubes can be configured in an extremely close state electrically and physically (carbon nanotubes are substantially in direct contact with each other).

When forming the carbon nanotube structure with a cross-linking application liquid prepared by selecting a single functional group of the carbon nanotubes and a single not-self-polymerizable cross-linking agent, the cross-linked site of the layer will have the same cross-linking structure (Example 1). Further, even when forming the carbon nanotube structure layer with a cross-linking application liquid prepared by selecting multiple types of functional groups of the carbon nanotubes and/or multiple types of not-self-polymerizable cross-linking agents, the cross-linked site of the layer will mainly have a cross-linking structure based on a combination of the functional group and the not self-polymerizable cross-linking agent mainly used (Example 2).

On the contrary, when forming the carbon nanotube structure layer with a cross-linking application liquid prepared by selecting functional groups of the carbon nanotubes of not-self-polymerizable cross-linking agents, without regard to whether the functional groups and the cross-linking agents are of single or multiple types, the cross-linked site of the layer will not mainly have a specific cross-linking structure. The cross-linked site will be in a state in which numerous connecting groups with different connecting (polymerization) numbers of the cross-linking agents coexist.

In other words, by selecting not self-polymerizable cross-linking agents, the cross-linked site, where the carbon nanotubes of the carbon nanotube structure layer cross-link together, bond with the functional group through a residue of only one cross-linking agent, thus forming mainly identical cross-linking structure. "Mainly identical" here is a concept including a case with all of the cross-linked sites having identical cross-linking structure as described above (Example 1), as well as a case with the cross-linking structure based on a combination of the functional group mainly used and the not self-polymerizable cross-linking agent becomes a main structure with respect to the whole cross-linked site as described above (Example 2).

A "ratio of identical cross-linked sites" with respect to the whole cross-linked sites will not have a uniform lower limit defined. The reason is that a case of imparting a functional group or a cross-linking structure with a different aim from formation of a carbon nanotube network may be assumed for example, when referring as "mainly identical". However, in order to actualize high electrical or physical characteristics inherent in carbon nanotubes with a strong network, a "ratio of identical cross-linked sites" with respect to the total cross-linked sites is preferably 50% or more, more preferably 70% or more, further more preferably 90% or more, and most preferably all identical, based on numbers. Those number ratios can be determined through a method of measuring an intensity ratio of an absorption spectrum corresponding to the cross-linking structure with infrared spectrum or the like.

As described, if a carbon nanotube structure layer has the cross-linked site where carbon nanotubes cross-link with a mainly identical cross-linking structure, a uniform network of the carbon nanotubes can be formed in a desired state. In addition, the carbon nanotube network can be configured with homogeneous, satisfactory, and expected electrical or physical characteristics and high duplicability.

Further, the connecting group preferably contains hydrocarbon for a skeleton thereof "Hydrocarbon for a skeleton" here refers to a main chain portion of the connecting group consisting of hydrocarbon, the main portion of the connecting group contributing to connecting residues together of the functional groups of carbon nanotubes to be cross-linked remaining after a cross-linking reaction. A side chain portion, where hydrogen of the main chain portion is substituted by another substituent, is not considered. Obviously, it is more preferable that the whole connecting group consists of hydrocarbon.

A number of carbon atoms in the hydrocarbon is preferably 2 to 10, more preferably 2 to 5, and further more preferably 2 to 3. The connecting group is not particularly limited as long as it is divalent or more.

In the cross-linking reaction of the functional group —COOR (R is a substituted or unsubstituted hydrocarbon) and ethylene glycol, exemplified as a preferable combination of the functional group of carbon nanotubes and the cross-linking agent, the cross-linked site, where plural carbon nanotubes cross-link to one another, becomes —COO$(CH_2)_2$OCO—.

Further, in the cross-linking reaction of the functional group —COOR (R is a substituted or unsubstituted hydrocarbon) and glycerin, the cross-linked site, where plural carbon nanotubes cross-link to one another, becomes —COOCH$_2$CHOHCH$_2$OCO— or —COOCH$_2$CH(OCO—)CH$_2$OH if two OH groups contribute in the cross-link, and —COOCH$_2$CH(OCO—)CH$_2$OCO— if three OH groups contribute in the cross-link.

Further, in the second method forming the cross-linked site through chemically bonding plural functional groups, in which at least one end of the cross-linked site is bonded to different carbon nanotubes respectively, the carbon nanotube structure has carbon nanotubes connected through a cross-linked portion in a matrix form, thus forming a stable bond. That is, in the carbon nanotube structure, carbon nanotubes are tightly connected together, and other binders are not contained. Therefore, the carbon nanotube structure is substantially configured with carbon nanotubes only, and thus has high chemical stability.

Further, the cross-linked sites are formed by a reaction among the functional groups, thus enabling an enhancement of the actual carbon nanotube density of the carbon nanotube structure. If the functional groups are reduced in size, the carbon nanotubes can be brought very close to one another both electrically and physically, prescribed electric resistance characteristics can be obtained even if the electric resistance body has a minute size.

Further, cross-linked sites are chemical bonds of the functional groups, thus the carbon nanotube structures mainly have the same cross-linking structure. Therefore, a uniform network of carbon nanotubes can be brought into a desired state. Therefore, electric and physical carbon nanotube characteristics that are homogeneous and excellent can be obtained. Furthermore, the exact characteristics expected from carbon nanotubes, or close to the expected level or with high duplicability, can be obtained.

As has been described in a resistance element of the present invention, a carbon nanotube structure layer has a mesh structure that is composed of plural carbon nanotubes connected to one another through plural cross-linked sites. Thus, contact or arrangement of carbon nanotubes is not disturbed, unlike a mere carbon nanotube dispersion film, thereby realizing a resistivity as designed. Furthermore, the carbon nanotube structure layer can be patterned highly freely, giving the electric resistance body various shapes and realizing the prescribed resistivity.

Further, a protective layer or other various functional layers may be put on the patterned carbon nanotube structure layer as a top layer of the carbon nanotube structure layer. When provided with a protective layer, the carbon nanotube structure layer, which is a network of cross-linked carbon nanotubes, can be kept more solidly to the base body surface and protected from external forces. A resist layer to be described in the section of [Method of Manufacturing a Resistance Element] may be utilized as the protective layer if the resist layer is left instead of being removed. It is also effective to newly form a protective layer that covers the entire surface including regions of the carbon nanotube structure layer that are to be removed and not to form a pattern corresponding to the electric resistance body. Various known resin materials and inorganic materials can be employed, without a problem, to form a protective film that suits the purpose.

The carbon nanotube structure layer and another such carbon nanotube structure layer may be layered with some functional layer interposed between the two layers. If the functional layer is an insulating layer and the carbon nanotube structure layers are shaped into an appropriate pattern and connected to each other at the interlayer, a highly integrated device can be manufactured. For the interlayer connection, a still another carbon structure layer may be provided, or a new carbon nanotube may be used for wiring, or a metal film or other measure may be taken for wiring.

As already mentioned, the base body may be a substrate that has plasticity or flexibility. With a plastic or flexible substrate serving as the base body, the entire carbon nanotube structure is improved in flexibility, and options of places to install the carbon nanotube structure (environments in which the carbon nanotube structure can be used) are increased greatly.

In addition, when constituting a device, a resistance element that uses a plastic or flexible substrate can be adapted to various arrangements in the device and can take various shapes, allowing a use as an electric resistance body of the resistance element with high mountability.

Specifics of the above-described resistance element of the present invention including its shape and the like will be made clear in the following section of [Method of Manufacturing a Resistance Element] and Example. Note that the descriptions below show merely examples and are not to limit specific modes of the resistance element of the present invention.

[Method of Manufacturing a Resistance Element]

A resistance element manufacturing method of the present invention is a method suitable for manufacture of the above-described resistance element of the present invention. Specifically, the carbon nanotube manufacturing method of the present invention includes (A) a supplying step of supplying a surface of a base body with a liquid solution (cross-linking application liquid) that contains carbon nanotubes having functional groups, and (B) a cross-linking step of forming a carbon nanotube structure layer that has a mesh structure composed of the plural carbon nanotubes that are cross-linked to one another by chemical bonds formed among the functional groups. The carbon nanotube manufacturing method of the present invention may include additional steps such as (C) a patterning step of patterning the carbon nanotube structure layer into a desired shape.

(A) Supplying Step

In the present invention, a supplying step is a step of supplying the base body surface with a liquid solution (cross-linking application liquid) that contains carbon nanotubes having functional groups and, if necessary, a cross-linking agent that prompts a cross-linking reaction with the functional group or an additive that causes the functional groups to bond chemically among themselves. The liquid solution is preferably applied. The cross-linking application liquid has to be supplied in the supplying step to all regions where the carbon nanotube structure layer is to be formed (desired regions) but, as long as these desired regions are included, there is no need to supply the entire base body surface with the application liquid.

Any method can be applied to supply the cross-linking application liquid, and the liquid may be simply dropped or spread with a squeegee or may be applied by a common application method. Examples of common application methods include spin coating, wire bar coating, cast coating, roll coating, brush coating, dip coating, spray coating, and curtain coating. For descriptions of the base body, the carbon nanotubes having functional groups, the cross-linking agent, and the cross-linking application liquid, see the section of [Resistance Element].

(B) Cross-linking Step

In the present invention, a cross-linking step is a step of forming a carbon nanotube structure layer that has a mesh structure constituted of the plural carbon nanotubes cross-linked with one another through curing of the cross-linking application liquid after application. The cross-linking application liquid has to be cured in the cross-linking step to form the carbon nanotube structure layer in all the desired regions but, as long as the desired regions are included, there is no need to cure all of the cross-linking application liquid supplied to the base body surface.

What operation should be carried out in the cross-linking step is naturally determined by the combination of the functional groups with the cross-linking agent or the additive for chemically bonding the functional groups together. An example thereof is shown in Table 1. If a combination of thermally curable functional groups is employed, the applied liquid is heated by a heater or the like. If a combination of functional groups that are cured by ultraviolet rays is employed, the applied liquid is irradiated with a UV lamp or left under the sun. If a combination of self-curable functional groups is employed, it is sufficient to let the applied liquid stand still. Leaving the applied liquid to stand still is deemed as one of the operations that may be carried out in the cross-linking step of the present invention.

Heat curing (polyesterification through ester exchange reaction) is conducted for the case of a combination of carbon nanotubes, to which the functional group —COOR (R is a substituted or unsubstituted hydrocarbon group) is added, and polyol (among them, glycerin and/or ethylene glycol). By heating, —COOR of the esterified carbon nanotube carboxylic acid and R'—OH (R' is a substituted or unsubstituted hydrocarbon group) of polyol react in ester exchange reaction. As the dehydration condensation reaction progresses multilaterally, the carbon nanotubes are cross-linked until a network of carbon nanotubes connected to one another constitutes a carbon nanotube structure layer.

To give an example of conditions preferable for the above combination, the heating temperature is set to 50 to 500° C., more desirably 150 to 200° C., and the heating period is set to 1 minute to 10 hours, more desirably 1 hour to 2 hours.

(C) Patterning Step

In the present invention, a patterning step is for patterning the carbon nanotube structure layer corresponding to the electric resistance body. FIG. 2(e) is a schematic sectional view showing the surface state of the base body after (C) the patterning step. Although no particular limitations are put on patterning operations, there are two preferred modes of (C-A) and (C-B) given for the patterning step.

(C-A)

In Mode (C-A), dry etching is performed on other regions of the carbon nanotube structure layer on the base body surface than the region to be patterned corresponding to the electric resistance body, thus removing the carbon nanotube structure layer from those regions and patterning the carbon nanotube structure layer into a pattern of the desired shape.

Patterning the carbon nanotube structure layer corresponding to the electric resistance body by dry etching means that other regions of the carbon nanotube structure layer on the base body surface than the region to form the desired shape receive irradiation of radicals or the like. Methods of irradiation of radicals or the like include one in which the other regions of the carbon nanotube structure layer than the region to form the pattern is directly irradiated with radicals or the like (C-A-1), and one in which the other regions than the region to form the pattern are covered with a resist layer and then the entire base body surface (on the side where the carbon nanotube structure layer and the resist layer are formed) is irradiated with radicals or the like (C-A-2).

(C-A-1)

Direct irradiation of the other regions of the carbon nanotube structure layer than the region to form the pattern with radicals or the like specifically means that regions of the carbon nanotube structure layer on the base body surface other than the region to be patterned corresponding to the electric resistance body are irradiated with ion beams of gas molecule ions, thereby removing the carbon nanotube structure layer from the irradiated regions and patterning the carbon nanotube structure layer into the desired shape.

In the form of an ion beam, ions of gas molecules can be radiated selectively with precision on the order of several nm. This method is preferable in that the carbon nanotube structure layer can be patterned corresponding to the electric resistance body in one operation.

Examples of gas species that can be chosen for the ion beam method include oxygen, argon, nitrogen, carbon dioxide, and hexafluoride. Oxygen is particularly desirable in the present invention. In the ion beam method, a voltage is applied to gas molecules in vacuum to accelerate and ionize the gas molecules and the obtained ions are radiated in the form of a beam. The ion beam method is capable of etching various substances with varying irradiation accuracy by changing the type of gas used.

(C-A-2)

To employ Mode (C-A-2) in which the other regions than the region to form the pattern are covered with a resist layer before the entire base body surface is irradiated with radicals or the like, the patterning step includes: a resist layer forming step (C-A-2-1) of forming a resist layer on the region of the carbon nanotube structure layer on the base body surface that is to be patterned corresponding to the electric resistance body; and a removing step (C-A-2-2) of performing dry etching on the side of the base body where the carbon nanotube structure layer and the resist layer are layered, thereby removing the carbon nanotube structure layer from the exposed regions that are not covered with the resist layer. The removing step in Mode (C-A-2) may be followed by a resist layer peeling step (C-A-2-3) in which the resist layer formed in a resist layer forming step is peeled off.

(C-A-2-1) Resist Layer Forming Step

Figure 2:
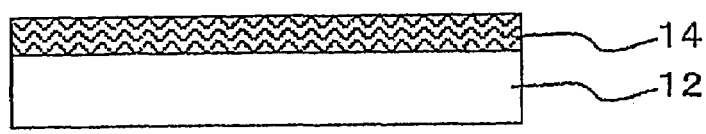
FIG. 2 shows a schematic sectional view of a base body surface for explaining an example of a method of manufacturing a resistance element of the present invention, in which steps of manufacturing are shown in an order of (a) to (e)
Figure 2:
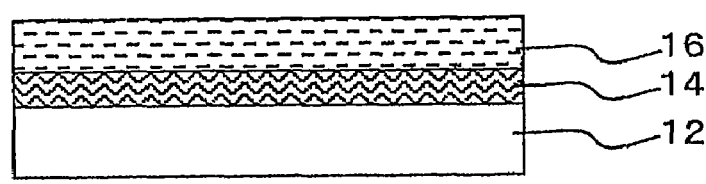
Figure 2:
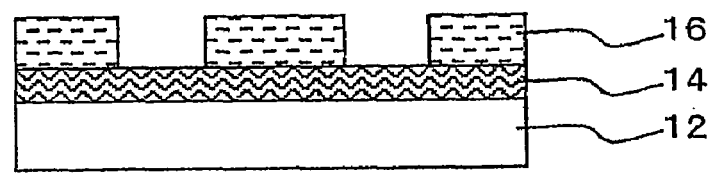
Figure 2:
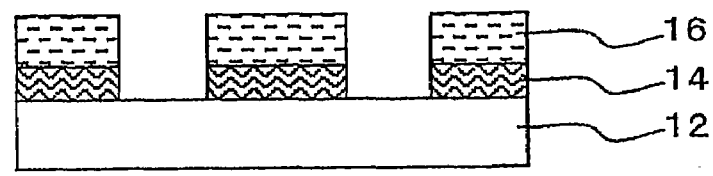
Figure 2:
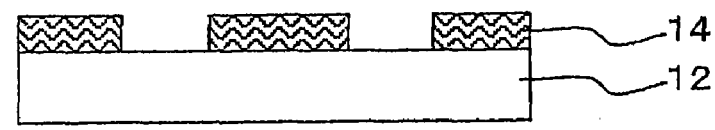

In the resist layer forming step, a resist layer is formed on the region of the carbon nanotube structure layer on the base body surface that is to be patterned corresponding to the electric resistance body. This step follows a process generally called a photolithography process and, instead of directly forming a resist layer on the region of the carbon nanotube structure layer that is to be patterned corresponding to the electric resistance body, a resist layer 16 is once formed on the entire surface of a base body 12 on the side where a carbon nanotube structure layer 14 is formed as shown in FIG. 2(*b*). Then the region to form the pattern of desired shape is exposed to light and portions that are not exposed to light are removed through subsequent development. Ultimately, the resist layer is present only on the region of the carbon nanotube structure layer that is to form a pattern corresponding to the electric resistance body.

FIG. 2(*c*) is a schematic sectional view showing the surface state of the base body after the resist layer forming step (C-A-2-1). Depending on the type of resist, a portion that is exposed to light is removed by development whereas a portion that is not exposed to light remains. A known method can be employed to form the resist layer. Specifically, the resist layer is formed by applying a resist agent to the substrate with a spin coater or the like and then heating the applied agent.

There is no particular limitation on the material (resist agent) used to form the resist layer 16, and various known resist materials can be employed without any modification. Employing resin (forming a resin layer as the resist layer 16) is particularly desirable. The carbon nanotube structure layer 14 has a mesh-like network of carbon nanotubes and is a porous structure. Accordingly, if the resist layer 16 is formed from a metal evaporation film or like other material that forms a film on the very surface and does not infiltrate deep into the holes of the mesh, carbon nanotubes cannot be sealed satisfactorily against radiation of plasma or the like (insufficient sealing means exposure to plasma or the like). As a result, plasma or the like enters from the holes and corrodes the carbon nanotube layer 14 under the resist layer 16, reducing the contour of the carbon nanotube structure layer 14 and leaving only a small portion of the carbon nanotube structure layer 14. Although it is possible to give the resist layer 16 a larger contour (area) than the pattern corresponding to the electric resistance body taking into account this reduction in size, this method requires a wide gap between patterns and therefore makes it impossible to form patterns close together.

In contrast, when resin is used to form the resist layer 16, the resin enters the spaces inside the holes and reduces the number of carbon nanotubes that are exposed to plasma or the like. As a result, high density patterning of the carbon nanotube structure layer 14 is made possible.

Examples of the resin material that mainly constitutes the resin layer include, novolak resin, polymethyl methacrylate, and a mixture of the two, but not limited thereto.

The resist material for forming the resist layer is a mixture of one of the above resin materials, or a precursor thereof, and a photosensitive material or the like. The present invention can employ any known resist material. For instance, OFPR 800, a product of TOKYO OHKA KOGYO CO., LTD. and NPR 9710, a product of NAGASE & CO., LTD. can be employed.

Appropriate operations or conditions of exposure of the resist layer 16 to light (heating if the resist material used is thermally curable, a different exposure method is chosen for a different type of resist material) and development are selected in accordance with the resist material used. (Examples of exposure and development operations or conditions include the light source wavelength, the intensity of exposure light, the exposure time, the exposure amount, environmental conditions during exposure, the development method, the type and concentration of developer, the development time, and content of pre-treatment or post-treatment.) When a commercially available resist. material is used, exposure and development are performed following the instruction manual for the product. In general, a UV-curable resist material is chosen for conveniences of handling and exposed to ultraviolet rays drawing the pattern corresponding to the electric resistance body. Thereafter, the film is developed using an alkaline developer, which is then washed off with water, and is let dry to complete the photolithography process.

(C-A-2-2) Removing Step

In the removing step, dry etching is performed on the side of the base body where the carbon nanotube structure layer and the resist layer are layered, thereby removing the carbon nanotube structure layer from the exposed regions that are not covered with the resist layer (for the exposed regions, see FIG. 2(*c*). The carbon nanotube structure layer 14 is exposed in regions where the resist layer 16 is removed). FIG. 2(*d*) is a schematic sectional view showing the surface state of the base body after the removing step (C-A-2-2).

The removing step can employ every method that is generally called dry etching, including the reactive ion method. The above-described ion beam method in (C-A-1) is one of dry etching methods. See the section (C-A-1) for employable gas species, devices, operation environments, and the like.

In the present invention, oxygen is particularly desirable out of examples of gas species generally usable in dry etching which include oxygen, argon, and fluorine-based gas (e.g., chlorofluoro carbon, $SF_6$, and $CF_4$). With oxygen radicals, carbon nanotubes in the regions of the carbon nanotube structure layer 14 that are to be removed are oxidized (burnt) and turned into carbon dioxide. Accordingly, the residue has little adverse effect, and accurate patterning is achieved.

When oxygen is chosen as gas species, oxygen radicals are generated by irradiating oxygen molecules with ultraviolet rays. A device that generates oxygen radicals by this method is commercially available by the name of UV washer, and is easy to obtain.

(C-A-2-3) Resist Layer Peeling Step

The resistance element manufacturing method of the present invention may end with the completion of the removing step (C-A-2-2), presenting a mode of the resistance element of the present invention (the mode shown in FIG. 2(*d*)). If the resist layer 16 is to be removed from the carbon nanotube structure of this mode, the removing step has to be followed by the resist layer peeling step in which the resist layer 16 formed in the resist layer forming step is peeled off. FIG. 2(*e*) is a schematic sectional view showing the surface state of the base body after the resist layer peeling step (C-A-2-3).

An appropriate resist layer peeling step operation is chosen in accordance with the material used to form the resist layer 16. When a commercially available resist material is used, the resist layer 16 is peeled off following the instruction manual for the product. When the resist layer 16 is a resin layer, a common removal method is to bring the resin layer into contact with an organic solvent that is capable of dissolving the resin layer.

(C-B)

The patterning step includes:

The resist layer forming step of forming a resist layer on the region of the carbon nanotube structure layer on the base body surface that is to be patterned corresponding to the electric resistance body; and The removing step of bringing an etchant into contact with the side of the base body where the carbon nanotube structure layer and the resist layer are layered, thereby removing the carbon nanotube structure layer from the exposed regions that are not covered with the resist layer. This patterning step mode is a method commonly called wet etching (a method of removing an arbitrary portion using chemical=etchant).

The resist layer forming step in Mode (C-B) is identical with the resist layer forming step (C-A-2-1) described above except that a resist material resistant to etchant should be used in Mode (C-B). Similar to the patterning step in Mode (C-A), the removing step in Mode (C-B) of the patterning step may be followed by the resist layer peeling step and details of this peeling step are as described in the resist layer peeling step (C-A-2-3). Detailed descriptions of these steps are therefore omitted here.

Reference is made to FIG. 2(c). In the removing step in Mode (C-B), an etchant is brought into contact with the side of the base body 12 where the carbon nanotube structure layer 14 and the resist layer 16 are layered, thereby removing the carbon nanotube structure layer 14 from the exposed regions that are not covered with the resist layer 16. In the present invention, an etchant can be brought into contact with the carbon nanotube structure layer by any method that can bring a liquid into contact with a subject, such as dipping, spraying, and letting a liquid flow over a subject.

Etchant is in general an acid or alkali. Which etchant to choose is determined by the resist material constituting the resist layer 16, the structure of cross-linking among carbon nanotubes in the carbon nanotube structure layer 14, and other factors. A desirable etchant is one that etches the resist layer 16 as little as possible and that can easily remove the carbon nanotube structure layer 14.

However, an etchant that etches the resist layer 16 may be employed if it is possible to, by appropriately controlling the temperature and concentration of the etchant and how long the etchant is in contact with the carbon nanotube structure layer, remove the exposed regions the carbon nanotube structure layer 14 before the resist layer 16 is completely etched away.

(D) Other Steps

The resistance element of the present invention can be manufactured through the above steps. However, the resistance element manufacturing method of the present invention may include additional steps.

For instance, it is preferable to put a surface treatment step of pre-treatment of the base body surface before the application step. The purpose of the surface treatment step is, for example, to enhance the absorption of the cross-linking application liquid to be applied, to enhance the adhesion between the base body surface and the carbon nanotube structure layer to be formed thereon, to clean the base body surface, or to adjust the electric conductivity of the base body surface.

An example of surface treatment for enhancing the absorption of the cross-linking application liquid is treatment by a silane coupling agent (e.g., aminopropyltriethoxysilane or γ-(2-aminoethyl) aminopropyltrimethoxysilane). Surface treatment by aminopropyltriethoxysilane is particularly widely employed and is preferable for the surface treatment step in the present invention. As documented by Y. L. Lyubchenko et al. in "Nucleic Acids Research vol. 21 (1993)" on pages 1117 to 1123, for example, surface treatment by aminopropyltriethoxysilane has conventionally been employed to treat the surface of a mica substrate for use in observation of AFM of DNA.

In the case where two or more carbon nanotube structure layers are to be layered, the operation of the resistance element manufacturing method of the present invention may be repeated twice or more. If an intermediate layer such as a dielectric layer or an insulating layer is to be interposed between carbon nanotube structure layers, while a step of forming an intermediate layer is inserted in between, the operation of the resistance element manufacturing method of the present invention may be repeated.

If a protective layer, an electrode layer, and other such layers are to be formed on the carbon nanotube structure layer, the manufacture method has to include steps for forming these layers. Appropriate materials and methods are chosen from known materials and methods, or materials and methods developed specially for the present invention are used, to form those layers.

<Application Example of the Resistance Element Manufacturing Method of the Present Invention>

In an effective application example of the resistance element manufacturing method of the present invention, the carbon nanotube structure layer is patterned on a surface of a temporary substrate and then transferred to a desired base body. It is also possible to modify a transfer step such that the patterned carbon nanotube structure layer is transferred from the temporary substrate to a surface of an intermediate transfer body and then to a desired base body (second base body).

The temporary substrate material that can be used, and is preferred, in this application example is the same as the base body material described in the section [Resistance Element]. However, a temporary substrate desirably has at least one flat surface, more desirably, the temporary substrate shaped like a flat plate from the view of transferability in the transfer step.

To be employable in this application example, a base body or an intermediate transfer body has to have an adhesive surface holding, or capable of holding, an adhesive. Common tape such as Scotch tape, paper tape, cloth tape, or imide tape can be used in the application example. In addition to the tape and other materials that have plasticity or flexibility, rigid materials may also be employed as a base body or an intermediate transfer body. In the case of a material that is not provided with an adhesive, an adhesive is applied to a surface of the material that can hold an adhesive, and then the material can be used in a similar fashion as a normal adhesive tape.

According to this application example, the resistance element of the present invention can be manufactured with ease.

It is also possible to manufacture a resistance element by preparing a carbon nanotube structure layer that is carried on a surface of a base body and attaching the carbon nanotube structure layer along with the base body to a surface of a desired second body (for example, a housing) that constitutes a device.

Alternatively, an electric resistance body of the resistance element can be manufactured while skipping the cross-linking step, if a carbon nanotube transfer body which carries a carbon nanotube structure layer on a surface of a temporary substrate (or intermediate transfer body) is used to transfer the carbon nanotube structure layer alone to a surface of a base body that constitutes the resistance element, and then the temporary substrate (or intermediate transfer body) is removed. Since the process is structured as such, the intermediate transfer body may serve as a temporary substrate of the carbon nanotube transfer body. Those cases are included in the present invention because there is no need for the carbon nanotube transfer body to discriminate an intermediate transfer body from a temporary substrate.

When the carbon nanotube transfer body is employed, the carbon nanotube structure layer with carbon nanotubes cross-linked to one another is carried on the surface of the temporary substrate, and this makes the carbon nanotube structure layer very easy to handle in the subsequent steps. As a result, manufacture of a resistance element is greatly facilitated. To remove the temporary substrate, an appropriate method is chosen from mechanical peeling, chemical decomposition, burn-off, melting, sublimation, dissolution, and the like.

The resistance element manufacturing method of this application example is effective particularly when a base body of a device has a material and/or shape that make it difficult to apply the resistance element manufacturing method of the present invention without some changes.

For instance, the application example of the present invention is effective when the temperature at which the applied liquid is cured in the cross-linking step is equal to or higher than the melting point or glass transition temperature of the material that is to be used as a base body of the resistance element. In this case, the heating temperature is set lower than the melting point of the temporary substrate to ensure a heating temperature necessary for the curing, and thus the resistance element of the present invention can be manufactured appropriately.

To give another example, the application example of the present invention is effective also when the patterning step takes a mode in which dry etching is performed on other regions of the carbon nanotube structure layer on the temporary substrate surface than the region to be patterned corresponding to the electric resistance body, thus removing the carbon nanotube structure layer from those regions and patterning the carbon nanotube structure layer into a pattern corresponding to the electric resistance body while the material that is to be used as a base body of the resistance element is not resistant to dry etching of the patterning step. In this case, a material resistant to dry etching is used as the temporary substrate so that the carbon nanotube structure can withstand the patterning step on the temporary substrate, and thus the resistance element of the present invention can be manufactured appropriately.

Although specifics on resistance and material are varied depending on dry etching conditions including gas species, intensity, time, temperature, and pressure, resin materials have relatively low resistance to dry etching. When a resin material is used as the base body, limitations brought by low resistance of the resin material are lifted by employing this application example. Therefore, forming the base body from a resin material is preferable in that merits of this application example are brought out. On the other hand, inorganic materials which have relatively high resistance to dry etching are suitable for the temporary substrate. In general, plastic or flexible materials have low resistance to dry etching and therefore using one of such materials as the base body is preferable in that merits of this application example are brought out.

To give another example, the application example of the present invention is effective also when the patterning step includes: a resist layer forming Step of forming a resist layer on the region of the carbon nanotube structure layer on the temporary substrate surface that is to be patterned corresponding to the electric resistance body; and a removing step of bringing an etchant into contact with the side of the temporary substrate where the carbon nanotube structure layer and the resist layer are layered, thereby removing the carbon nanotube structure layer from the exposed regions that are not covered with the resist layer while the base body has no resistance to the etchant used in a patterning step whereas the temporary substrate is resistant to the etchant. In this case, the base body in this application example serves as a base body of the resistance element and a material resistant to the etchant is used as the temporary substrate so that the carbon nanotube structure can withstand the patterning step on the temporary substrate. Thus the resistance element of the present invention can be manufactured appropriately.

Specifics on resistance and material are varied depending on etching conditions including the type, concentration and temperature of the etchant used, how long the etchant is in contact with the carbon nanotube structure layer, and the like. When an acidic etchant is used and a base body of the resistance element is to be formed from aluminum or like other materials that do not withstand acid, for example, limitations brought by low resistance of the base body material are lifted by employing this application example and using silicon or other materials that are resistant to acid as the temporary substrate. Limitations brought by low resistance are also lifted by using as the base body a material that has low resistance to an etchant as described above although depending on whether the etchant is acidic or alkaline.

Further, according to another mode, the resistance element of the present invention is made easy to handle even more if a base body that carries a carbon nanotube structure layer 24 is pasted onto a second base body. The obtained resistance element can be used to build the resistance element of the present invention and a device using the same. The second base body may be physically rigid or may be plastic or flexible, and can take various shapes including a spherical shape and a concave-convex shape.

A thermistor can be configured by configuring a mesh structure in which plural carbon nanotubes are mutually cross-linked through plural cross-linked sites, similar to the resistance element, and using the carbon nanotube structure which has a prescribed temperature dependence on an electrical resistivity as a thermistor base. As a method of manufacturing the thermistor, a method of manufacturing the resistance element described above can be used.

EXAMPLES

A more specific description of the present invention is given below through Example. However, the present invention is not limited to the following examples.

Example 1

Synthesis of Coating Material and Coat of Multi-wall Carbon Nanotube Cross-linked Using Glycerin (Addition Step)

Figure 3:
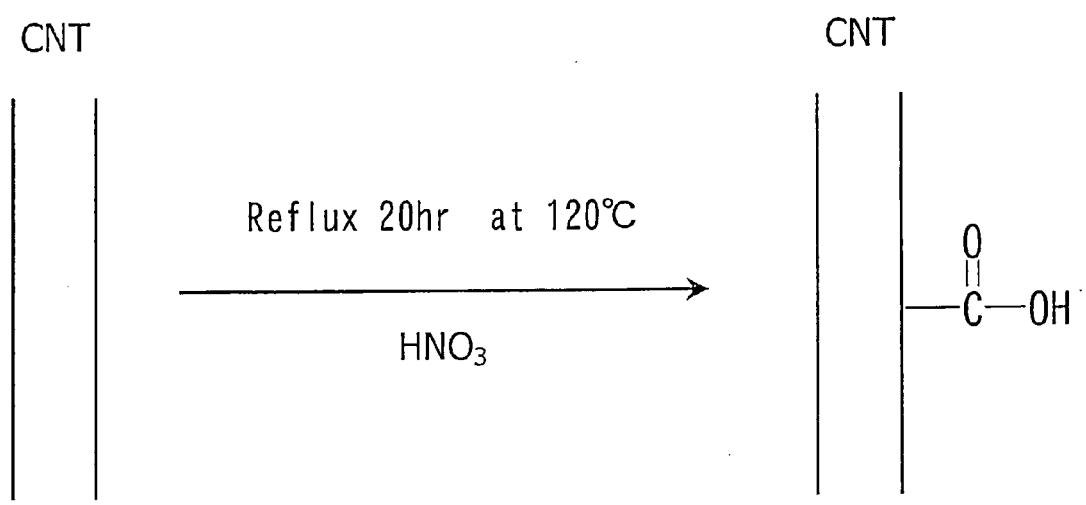
FIG. 3 is a reaction scheme for synthesis of carbon nanotube carboxylic acid in (addition step) in Example 1.

Addition of Carboxyl Group . . . Synthesis of Carbon Nanotube Carboxylic Acid 30 mg of multi-layer carbon nanotube powder (purity: 90%, average diameter: 30 nm, average length: 3 µm, a product of Science Laboratory Inc.) was added to 20 ml of concentrated nitric acid (a 60 mass % aqueous solution, a product of KANTO KAGAKU) for reflux at 120° C. for 20 hours to synthesize carbon nanotube carboxylic acid. A reaction scheme of the above is shown in FIG. 3. In FIG. 3, a carbon nanotube (CNT) is represented by two parallel lines (same applies for other figures relating to reaction scheme).

The temperature of the liquid solution was returned to room temperature and centrifuged at 5,000 rpm for 15 minutes to separate supernatant liquid from precipitate. The recovered precipitate was dispersed in 10 ml of pure water, and the dispersion liquid was subjected to centrifugal separation again at 5,000 rpm for 15 minutes to separate supernatant liquid from precipitate (The above process constitutes one washing operation). This washing operation was repeated five more times and lastly precipitate was recovered.

(Esterification)

Figure 4:
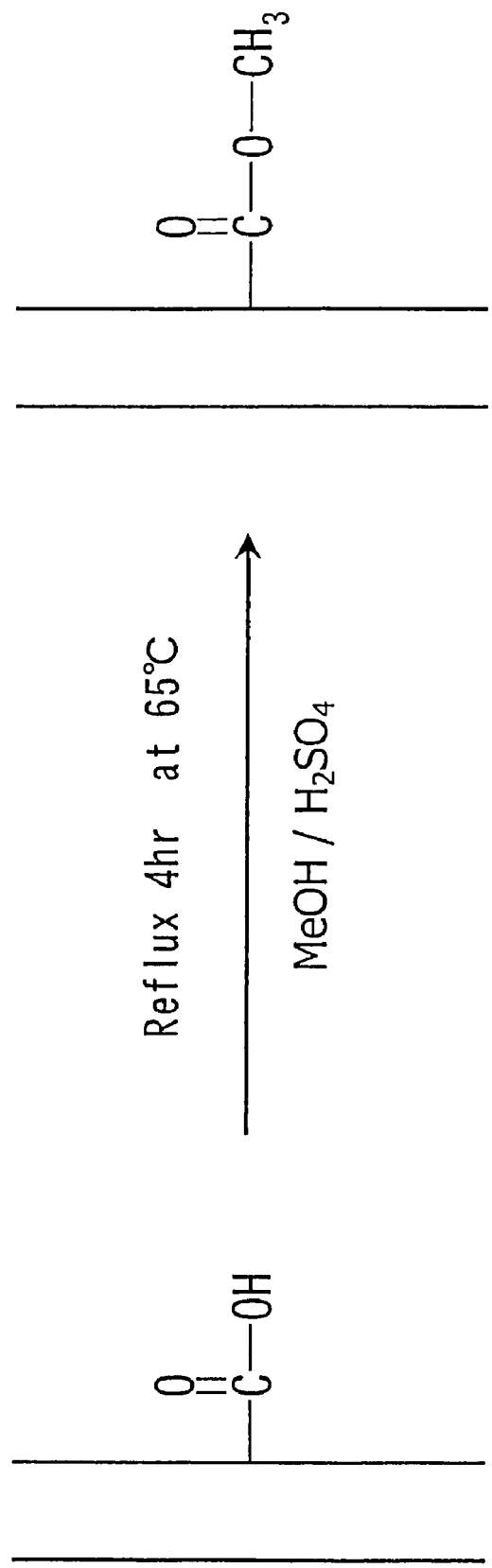
FIG. 4 is a reaction scheme for esterification in (addition step) in Example 1.

30 mg of the carbon nanotube carboxylic acid prepared in the above step is added to 25 ml of methanol (available from Wako Pure Chemical Industries, Ltd.). Then, 5 ml of concentrated sulfuric acid (98 mass %, available from Wako Pure Chemical Industries, Ltd.) was added, and reflux was conducted at 65° C. for 4 hours for methyl esterification. The above reaction scheme is shown in FIG. 4.

After returning a temperature of a solution liquid to room temperature, a precipitate was separated through filtration. The precipitate was washed with water and then collected.

(Mixing Step)

10 mg of the carbon nanotube carboxylic acid methyl esterified in the above step was added to 5 ml of glycerin (available from KANTO KAGAKU) and was mixed using an ultrasonic dispersing machine. Further, the mixture was added to 10 ml of methanol, a viscosity adjuster.

(Application Step)

About 0.1 ml of the thus obtained coating material was dropped and applied onto a $SiO_2$/Si substrate using a Pasteur pipette.

Figure 5:
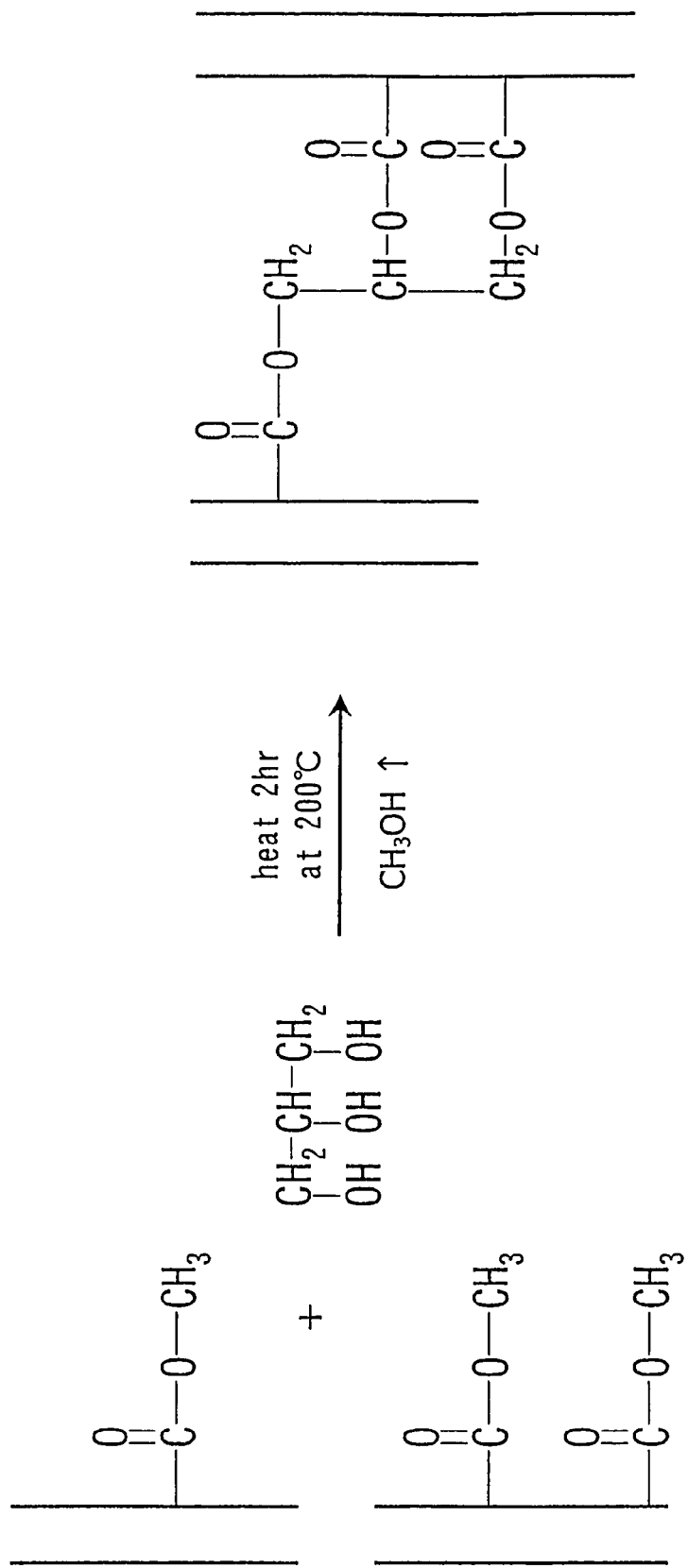
FIG. 5 is a reaction scheme for cross-linking by an ester exchange reaction in (cross-linking step) in Example 1.

The substrate to which the coating material of this example had been applied as above was heated at 200° C. for 2 hours to start polymerization by an ester exchange reaction and obtain a coat. A reaction scheme of this is shown in FIG. 5.

Example 2

Synthesis of Coating Material and Coat of Multi-wall Carbon Nanotube Cross-linked Using Hydroquinone (Addition Step)

Addition of Carboxyl Group . . . Synthesis of Carbon Nanotube Carboxylic Acid 30 mg of multi-layer carbon nanotube powder (purity: 90%, average diameter: 30 nm, average length: 3 µm, a product of Science Laboratory Inc.) was added to 20 ml of concentrated nitric acid (a 60 mass % aqueous solution, a product of KANTO KAGAKU) for reflux at 120° C. for 20 hours to synthesize carbon nanotube carboxylic acid. A reaction scheme of the above is shown in FIG. 3. In FIG. 3, a carbon nanotube (CNT) is represented by two parallel lines (same applies for other figures relating to reaction scheme).

The temperature of the liquid solution was returned to room temperature and centrifuged at 5,000 rpm for 15 minutes to separate supernatant liquid from precipitate. The recovered precipitate was dispersed in 10 ml of pure water, and the dispersion liquid was subjected to centrifugal separation again at 5,000 rpm for 15 minutes to separate supernatant liquid from precipitate. (The above process constitutes one washing operation.) This washing operation was repeated five more times and lastly precipitate was recovered.

(Mixing Step)

5 mg of the carbon nanotube carboxylic acid obtained in the above step and 30 mg of 1,4-hydroquinone (available from Wako Pure Chemical Industries, Ltd.) were added to 20 ml of dimethylformamide (available from Wako Pure Chemical Industries, Inc.), and then 30 mg of N-ethyl-N'-(3-dimethylaminopropyl)carbodiimide (hydrochloride, available from Aldrich Chemical Company, Inc.) was mixed using an ultrasonic dispersing machine.

(Application Step)

About 0.1 ml of the thus obtained coating material was dropped and applied onto a $SiO_2$/Si substrate using a Pasteur pipette.

(Curing Step)

Figure 6:
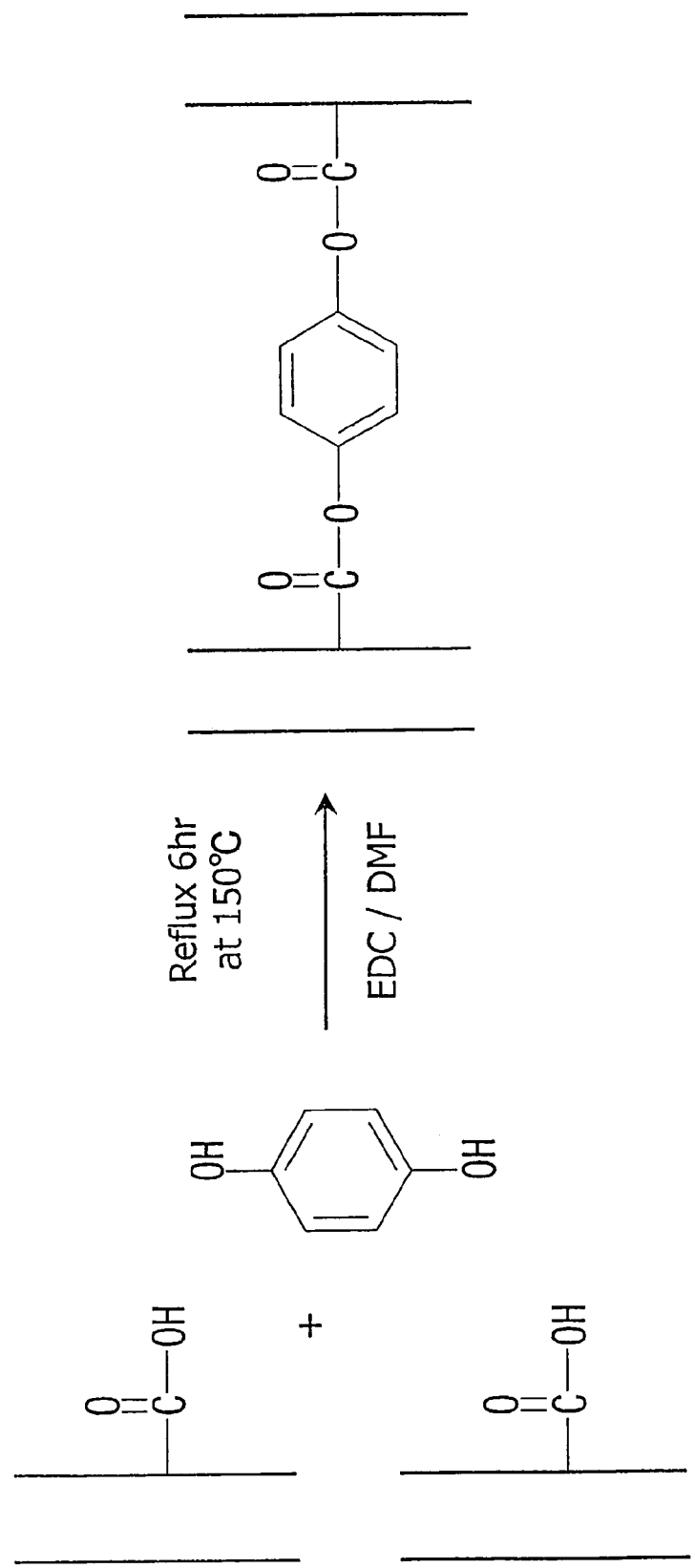
FIG. 6 is a reaction scheme for cross-linking by a dehydration condensation reaction in (cross-linking step) in Example 2.

The substrate to which the coating material of this example had been applied as above was heated at 200° C. for 10 minutes to start polymerization by a dehydration condensation reaction and obtain a coat. A reaction scheme of this is shown in FIG. 6.

Example 3

Synthesis of Coating Material and Coat of Multi-wall Carbon Nanotube Cross-linked Using Naphthalenediol (Addition Step)

Addition of Carboxyl Group . . . Synthesis of Carbon Nanotube Carboxylic Acid 30 mg of multi-layer carbon nanotube powder (purity: 90%, average diameter: 30 nm, average length: 3 µm, a product of Science Laboratory Inc.) was added to 20 ml of concentrated nitric acid (a 60 mass % aqueous solution, a product of KANTO KAGAKU) for reflux at 120° C. for 20 hours to synthesize carbon nanotube carboxylic acid. A reaction scheme of the above is shown in FIG. 3. In FIG. 3, a carbon nanotube (CNT) is represented by two parallel lines (same applies for other figures relating to reaction scheme).

The temperature of the liquid solution was returned to room temperature and centrifuged at 5,000 rpm for 15 minutes to separate supernatant liquid from precipitate. The recovered precipitate was dispersed in 10 ml of pure water, and the dispersion liquid was subjected to centrifugal separation again at 5,000 rpm for 15 minutes to separate supernatant liquid from precipitate. (The above process constitutes one washing operation.) This washing operation was repeated five more times and lastly precipitate was recovered.

(Mixing Step)

5 mg of the esterified carbon nanotube carboxylic acid obtained in the above step and 50 mg of 1,5-naphthalenediol (available from Wako Pure Chemical Industries, Ltd.) were added to 20 ml of dimethylformamide (available from Wako Pure Chemical Industries, Inc.), and then 30 mg of N-ethyl- N'-(3-dimethylaminopropyl)carbodiimide (hydrochloride, available from Aldrich Chemical Company, Inc.) was mixed using an ultrasonic dispersing machine.

(Application Step)

About 0.1 ml of the thus obtained coating material was dropped and applied onto a $SiO_2$/Si substrate using a Pasteur pipette.

Figure 7:
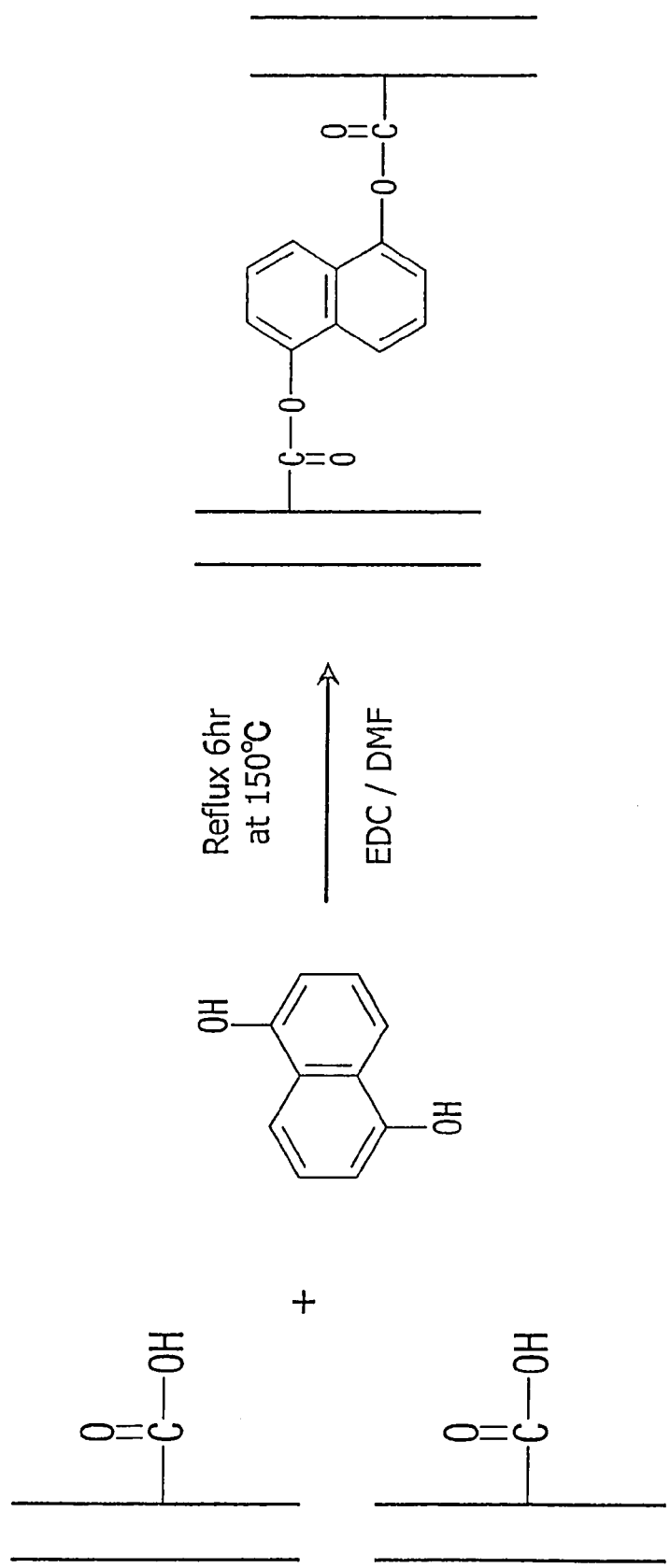
FIG. 7 is a reaction scheme for cross-linking by a dehydration condensation reaction in (cross-linking step) in Example 3.

The substrate to which the coating material of this example had been applied as above was heated at 200° C. for 10 minutes to start polymerization by a dehydration condensation reaction and obtain a coat. A reaction scheme of this is shown in FIG. 7.

Example 4

Synthesis of Coating Material and Coat of Multi-wall Carbon Nanotube Cross-linked Using Hexynediol (Addition Step)

Addition of Carboxyl Group . . . Synthesis of Carbon Nanotube Carboxylic Acid 30 mg of multi-layer carbon nanotube powder (purity: 90%, average diameter: 30 nm, average length: 3 μm, a product of Science Laboratory Inc.) was added to 20 ml of concentrated nitric acid (a 60 mass % aqueous solution, a product of KANTO KAGAKU) for reflux at 120° C. for 20 hours to synthesize carbon nanotube carboxylic acid. A reaction scheme of the above is shown in FIG. 3. In FIG. 3, a carbon nanotube (CNT) is represented by two parallel lines (same applies for other figures relating to reaction scheme).

The temperature of the liquid solution was returned to room temperature and centrifuged at 5,000 rpm for 15 minutes to separate supernatant liquid from precipitate. The recovered precipitate was dispersed in 10 ml of pure water, and the dispersion liquid was subjected to centrifugal separation again at 5,000 rpm for 15 minutes to separate supernatant liquid from precipitate. (The above process constitutes one washing operation.) This washing operation was repeated five more times and lastly precipitate was recovered.

(Mixing Step)

5 mg of the esterified carbon nanotube carboxylic acid obtained in the above step and 50 mg of 2,5-dimethyl-3-hexyne-2,5-diol (available from Wako Pure Chemical Industries, Ltd.) were added to 20 ml of dimethylformamide (available from Wako Pure Chemical Industries, Inc.), and then 30 mg of N-ethyl-N'-(3-dimethylaminopropyl)carbodiimide (hydrochloride, available from Aldrich Chemical Company, Inc.) was added to 5 ml of glycerin (available from KANTO KAGAKU) and was mixed using an ultrasonic dispersing machine.

(Application Step)

About 0.1 ml of the thus obtained coating material was dropped and applied onto a $SiO_2$/Si substrate using a Pasteur pipette.

(Curing Step)

Figure 8:
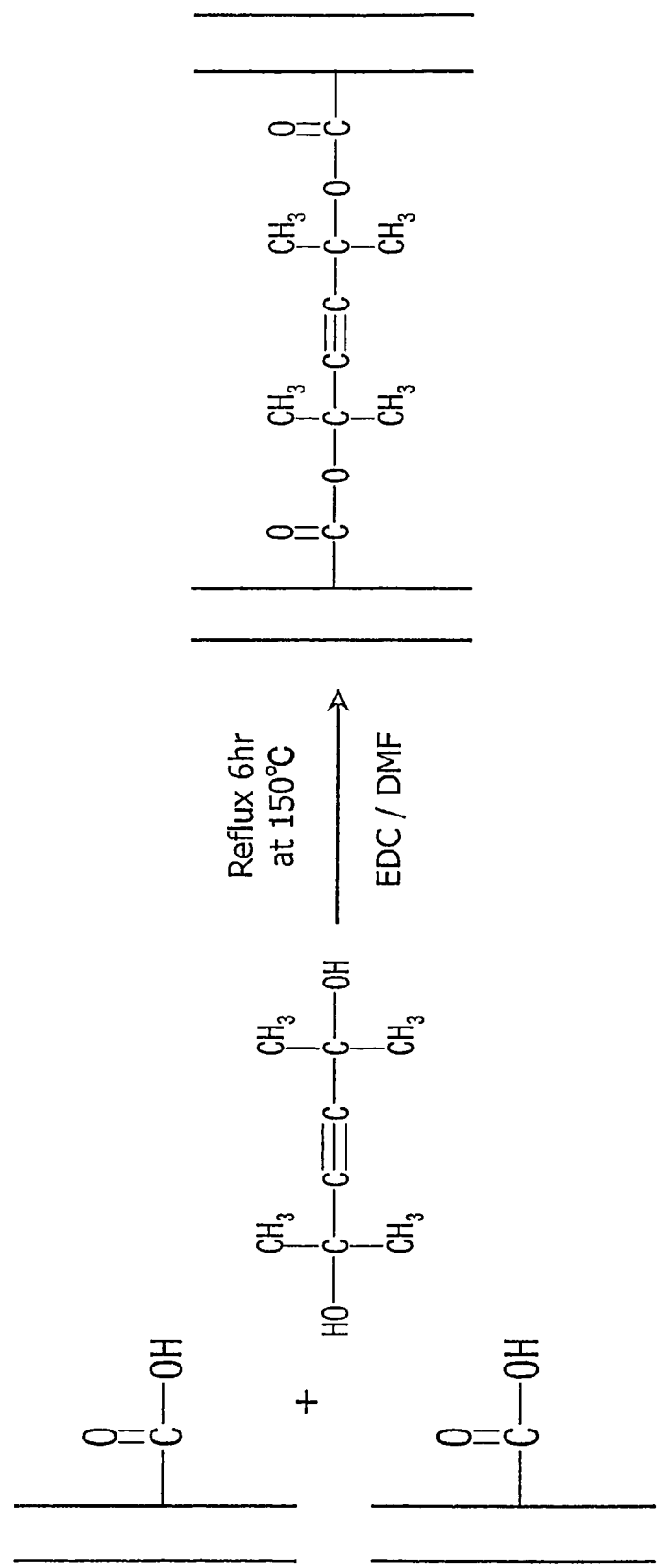
FIG. 8 is a reaction scheme for cross-linking by a dehydration condensation reaction in (cross-linking step) in Example 4.

The substrate to which the coating material of this example had been applied as above was heated at 200° C. for 10 minutes to start polymerization by a dehydration condensation reaction and obtain a coat. A reaction scheme of this is shown in FIG. 8.

Example 5

Synthesis of Coating Material and Coat of Multi-wall Carbon Nanotube Cross-linked Using Butenediol (Addition Step)

30 mg of multi-layer carbon nanotube powder (purity: 90%, average diameter: 30 nm, average length: 3 μm, a product of Science Laboratory Inc.) was added to 20 ml of concentrated nitric acid (a 60 mass % aqueous solution, a product of KANTO KAGAKU) for reflux at 120? C. for 20 hours to synthesize carbon nanotube carboxylic acid. A reaction scheme of the above is shown in FIG. 3. In FIG. 3, a carbon nanotube (CNT) is represented by two parallel lines (same applies for other figures relating to reaction scheme).

The temperature of the liquid solution was returned to room temperature and centrifuged at 5,000 rpm for 15 minutes to separate supernatant liquid from precipitate. The recovered precipitate was dispersed in 10 ml of pure water, and the dispersion liquid was subjected to centrifugal separation again at 5,000 rpm for 15 minutes to separate supernatant liquid from precipitate. (The above process constitutes one washing operation.) This washing operation was repeated five more times and lastly precipitate was recovered.

(Synthesis of 2-butene-1,4-diol)

After adding 1 g of 1,4-dibromo-2-butene (available from Sigma-Aldrich Co.) and 3 g of sodium acetate (available from Wako Pure Chemical Industries, Ltd.) into ethanol, reflux was conducted at 80° C. for 1 hour, to obtain 1,4-diacetoxy-2-butene. 1,4-diacetoxy-2-butene was dissolved in 30 ml of ethanol, and 20 ml of an aqueous sodium hydroxide solution (1 mol/l) was added, to synthesize 2-butene-1,4-diol.

(Mixing Step)

5 mg of the esterified carbon nanotube carboxylic acid obtained in the above step and 50 mg of 2-butene-1,4-diol (available from Wako Pure Chemical Industries, Ltd.) were added to 20 ml of dimethylformamide (available from Wako Pure Chemical Industries, Inc.), and then 30 mg of N-ethyl-N'-(3-dimethylaminopropyl)carbodiimide (hydrochloride, available from Aldrich Chemical Company, Inc.) was mixed using an ultrasonic dispersing machine.

(Application Step)

About 0.1 ml of the thus obtained coating material was dropped and applied onto a $SiO_2$/Si substrate using a Pasteur pipette.

(Curing Step)

Figure 9:
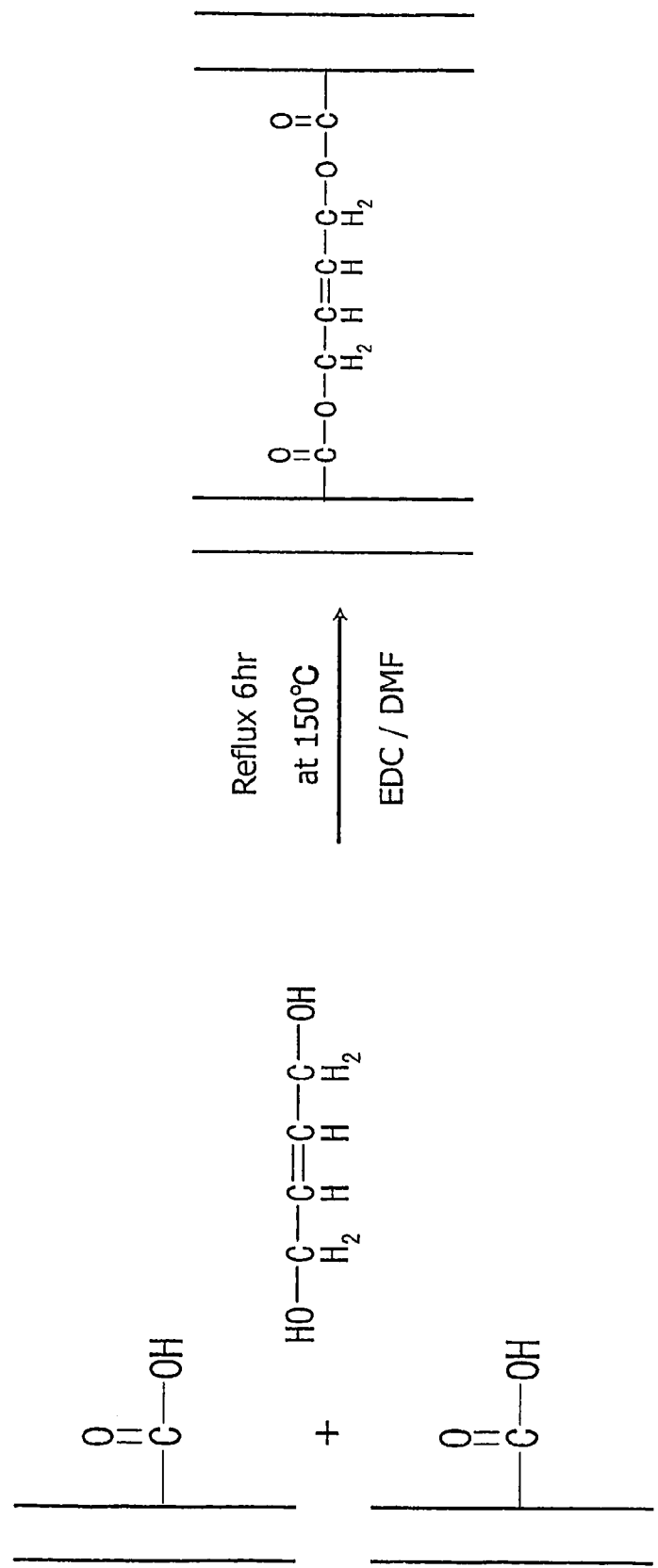
FIG. 9 is a reaction scheme for cross-linking by a dehydration condensation reaction in (cross-linking step) in Example 5.

The substrate to which the coating material of this example had been applied as above was heated at 200° C. for 10 minutes to start polymerization by a dehydration condensation reaction and obtain a coat. A reaction scheme of this is shown in FIG. 9.

Example 6

Synthesis of Coating Material and Coat of Multi-wall Carbon Nanotube Cross-linked Using Congo Red (Addition Step)

Addition of Carboxyl Group . . . Synthesis of Carbon Nanotube Carboxylic Acid 30 mg of multi-layer carbon nanotube powder (purity: 90%, average diameter: 30 nm, average length: 3 μm, a product of Science Laboratory Inc.) was added to 20 ml of concentrated nitric acid (a 60 mass % aqueous solution, a product of KANTO KAGAKU) for reflux at 120° C. for 20 hours to synthesize carbon nanotube carboxylic acid. A reaction scheme of the above is shown in FIG. 3. In FIG. 3, a carbon nanotube (CNT) is represented by two parallel lines (same applies for other figures relating to reaction scheme).

The temperature of the liquid solution was returned to room temperature and centrifuged at 5,000 rpm for 15 minutes to separate supernatant liquid from precipitate. The recovered precipitate was dispersed in 10 ml of pure water, and the dispersion liquid was subjected to centrifugal separation again at 5,000 rpm for 15 minutes to separate supernatant liquid from precipitate (The above process constitutes one washing operation.) This washing operation was repeated five more times and lastly precipitate was recovered.

(Mixing Step)

5 mg of the carbon nanotube carboxylic acid obtained in the above step and 200 mg of congo red were added to 20 ml of dimethylformamide (available from Wako Pure Chemical Industries, Inc.), and then 30 mg of N-ethyl-N'-(3-dimethylaminopropyl)carbodiimide (hydrochloride, available from Aldrich Chemical Company, Inc.) was mixed using an ultrasonic dispersing machine.

(Application Step)

About 0.1 ml of the thus obtained coating material was dropped and applied onto a $SiO_2$/Si substrate using a Pasteur pipette.

(Curing Step)

Figure 10:
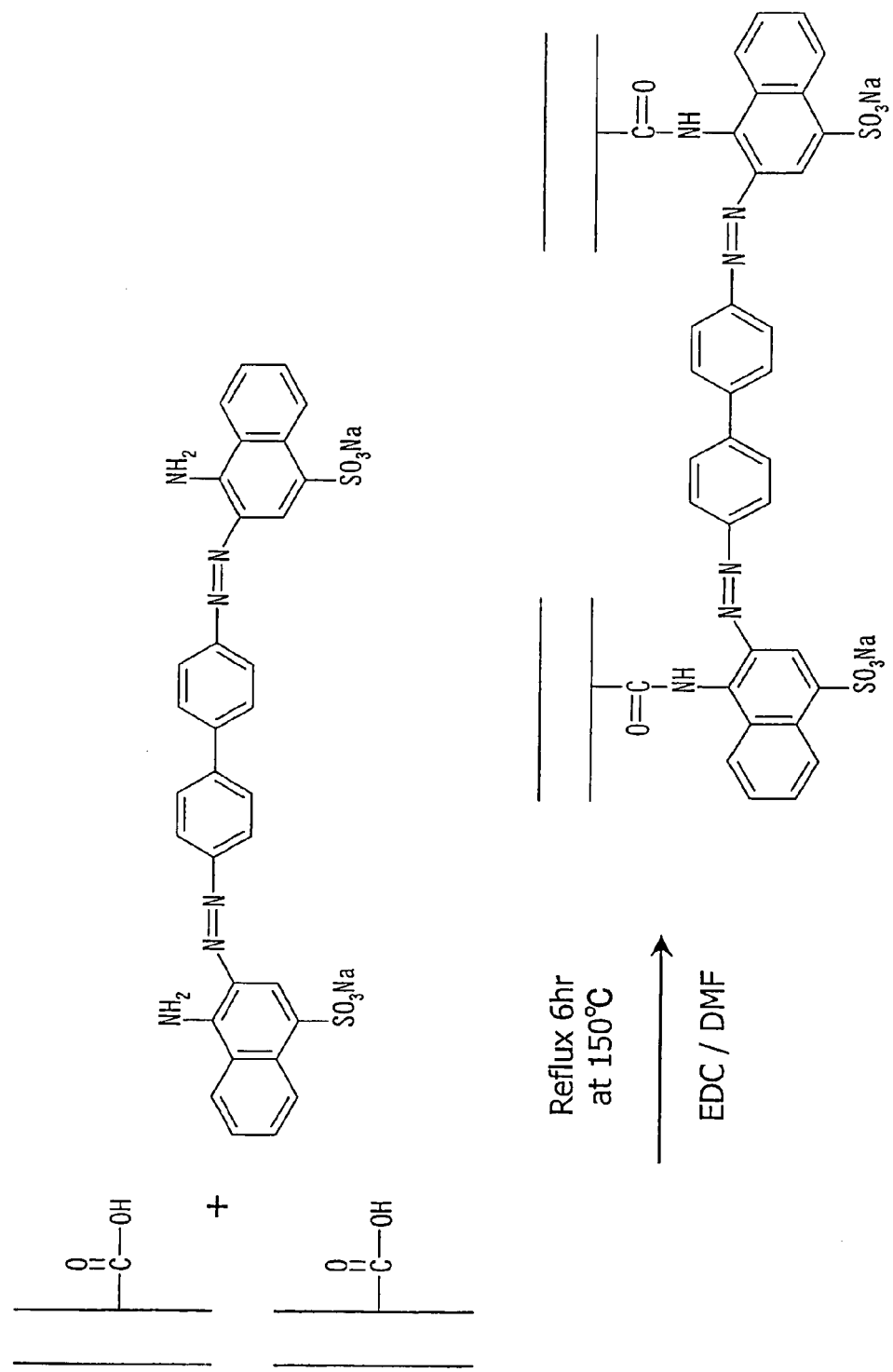
FIG. 10 is a reaction scheme for cross-linking by a dehydration condensation reaction in (cross-linking step) in Example 6.

The substrate to which the coating material of this example had been applied as above was heated at 200° C. for 10 minutes to start polymerization by a dehydration condensation reaction and obtain a coat. A reaction scheme of this is shown in FIG. 10.

Example 7

Synthesis of Coating Material and Coat of Multi-wall Carbon Nanotube Cross-linked Using Cisplatin (Addition Step)

Addition of Carboxyl Group . . . Synthesis of Carbon Nanotube Carboxylic Acid 30 mg of multi-layer carbon nanotube powder (purity: 90%, average diameter: 30 nm, average length: 3 μm, a product of Science Laboratory Inc.) was added to 20 ml of concentrated nitric acid (a 60 mass % aqueous solution, a product of KANTO KAGAKU) for reflux at 120° C. for 20 hours to synthesize carbon nanotube carboxylic acid. A reaction scheme of the above is shown in FIG. 3. In FIG. 3, a carbon nanotube (CNT) is represented by two parallel lines (same applies for other figures relating to reaction scheme).

The temperature of the liquid solution was returned to room temperature and centrifuged at 5,000 rpm for 15 minutes to separate supernatant liquid from precipitate. The recovered precipitate was dispersed in 10 ml of pure water, and the dispersion liquid was subjected to centrifugal separation again at 5,000 rpm for 15 minutes to separate supernatant liquid from precipitate. (The above process constitutes one washing operation.) This washing operation was repeated five more times and lastly precipitate was recovered.

(Mixing Step)

5 mg of the esterified carbon nanotube carboxylic acid obtained in the above step and 50 mg of cis-diaminedichloroplatin (II) (available from Aldrich Chemical Company, Inc.) were added to 20 ml of dimethylformamide (available from Wako Pure Chemical Industries, Inc.), and then 30 mg of N-ethyl-N'-(3-dimethylaminopropyl)carbodiimide (hydrochloride, available from Aldrich Chemical Company, Inc.) was mixed using an ultrasonic dispersing machine.

(Application Step)

About 0.1 ml of the thus obtained coating material was dropped and applied onto a $SiO_2$/Si substrate using a Pasteur pipette.

(Curing Step)

Figure 11:
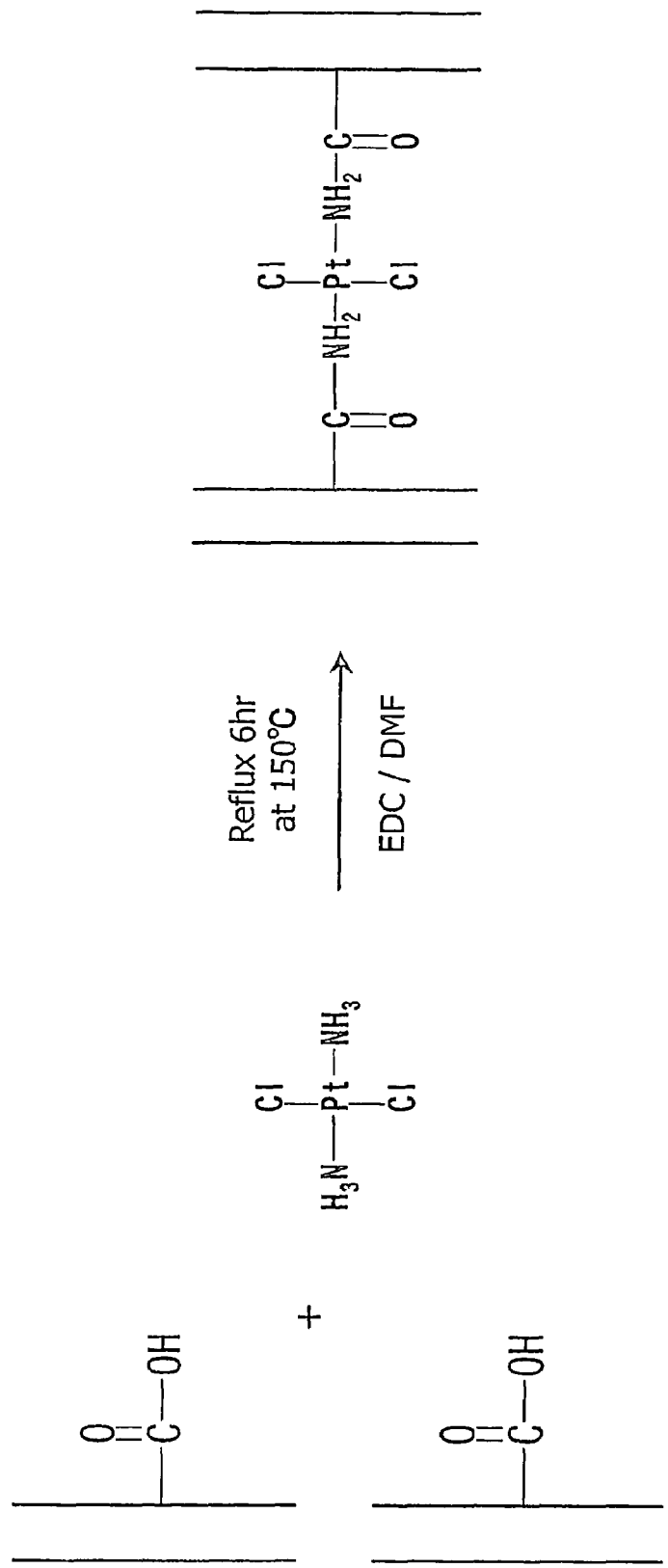
FIG. 11 is a reaction scheme for cross-linking by a dehydration condensation reaction in (cross-linking step) in Example 7.

The substrate to which the coating material of this example had been applied as above was heated at 200° C. for 10 minutes to start polymerization by a dehydration condensation reaction and obtain a coat. A reaction scheme of this is shown in FIG. 11.

Example 8

Synthesis of Coating Material and Coat of Multi-wall Carbon Nanotube Acid Anhydride (Addition Step)

Addition of Carboxyl Group . . . Synthesis of Carbon Nanotube Carboxylic Acid 30 mg of multi-layer carbon nanotube powder (purity: 90%, average diameter: 30 nm, average length: 3 μm, a product of Science Laboratory Inc.) was added to 20 ml of concentrated nitric acid (a 60 mass % aqueous solution, a product of KANTO KAGAKU) for reflux at 120° C. for 20 hours to synthesize carbon nanotube carboxylic acid. A reaction scheme of the above is shown in FIG. 3. In FIG. 3, a carbon nanotube (CNT) is represented by two parallel lines (same applies for other figures relating to reaction scheme).

The temperature of the liquid solution was returned to room temperature and centrifuged at 5,000 rpm for 15 minutes to separate supernatant liquid from precipitate. The recovered precipitate was dispersed in 10 ml of pure water, and the dispersion liquid was subjected to centrifugal separation again at 5,000 rpm for 15 minutes to separate supernatant liquid from precipitate. (The above process constitutes one washing operation.) This washing operation was repeated five more times and lastly precipitate was recovered.

(Mixing Step)

10 mg of the esterified carbon nanotube carboxylic acid obtained in the above step was added to 20 ml of dimethylformamide (available from Wako Pure Chemical Industries, Inc.), and then 30 mg of N-ethyl-N'-(3-dimethylaminopropyl)carbodiimide (hydrochloride, available from Aldrich Chemical Company, Inc.) was mixed using an ultrasonic dispersing machine.

(Application Step)

About 0.1 ml of the thus obtained coating material was dropped and applied onto a $SiO_2$/Si substrate using a Pasteur pipette.

Figure 12:
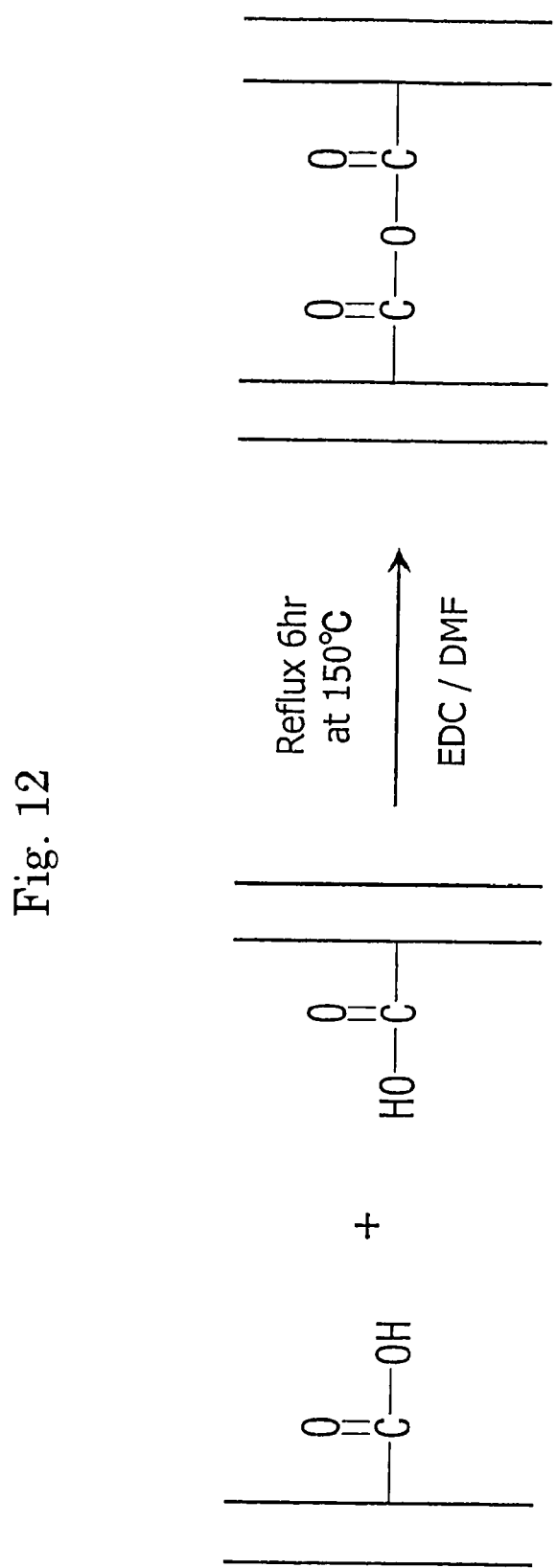
FIG. 12 is a reaction scheme for cross-linking by a dehydration condensation reaction in (cross-linking step) in Example 8.

The substrate to which the coating material of this example had been applied as above was heated at 200° C. for 10 minutes to start polymerization by a dehydration condensation reaction and obtain a coat. A reaction scheme of this is shown in FIG. 12.

[Evaluation Test (Measurement of DC Resistivity)]

A direct current-voltage characteristics measurement was conducted for a coat (MWNT-net (glycerin)) of Example 1, a coat (MWNT-net (hydroquinone)) of Example 2, a coat (MWNT-net (naphthalenediol)) of Example 3, a coat (MWNT-net (hexynediol)) of Example 4, a coat (MWNT-net (butenediol)) of Example 5, a coat (MWNT-net (congo red)) of Example 6, a coat (MWNT-net (Cisplatin)) of Example 7, and a coat (MWNT-net (carboxylic acid anhydride)). A thickness of each of the coats was 2 μm.

The measurement was performed through a two terminal method by depositing a gold electrode on a coat formed on a $SiO_2$/Si substrate and using picoammeter 4140B (manufactured by Hewlett-Packard Company). A resistivity of each of the coats obtained from the measurement result is shown in Table 3. It was found out that the resistivity can be controlled by changing the cross-linking molecule of the carbon nanotubes having a cross-linking structure.

TABLE 3

| Name of cross-linking agent | Structural formula of cross-linking portion | Resistivity ($\Omega$cm) |
| --- | --- | --- |
| Glycerin | | 0.06 |
| Cisplatin | | 0.13 |
| Naphthalenediol | | 0.10 |
| Butenediol | | 0.27 |
| Hexynediol | | 0.33 |
| Hydroquinone | | 0.85 |
| MWNT anhydride | | 0.97 |

TABLE 3-continued

| Name of cross-linking agent | Structural formula of cross-linking portion | Resistivity (Ωcm) |
|---|---|---|
| Congo red | (structure shown: naphthalene-SO$_3$Na with NH$_2$ and O=C— groups, linked via —N=N—C$_6$H$_4$—C$_6$H$_4$—N=N— to another naphthalene-SO$_3$Na with NH$_2$ and C=O— groups) | 2.41 |

Example 9

[Preparation of Resistance Element using Patterning]

A resistance element of 3.5 kΩ with a thickness of 2 μm, a width of 350 μm, and a length of 500 μm was prepared on the SiO$_2$/Si substrate using MWNT-net (hydroquinone).

A resist layer was formed on a surface of the coat (MWNT-net (hydroquinone)) of Example 2 using a spin coater (1H-DX2, manufactured by MIKASA Co., Ltd.), applying a resist agent (NPR9710, viscosity of 50 m·Pas, available from Nagase & Co., Ltd.) under the conditions of 2,000 rpm and 20 seconds, and heating using a hot plate at 100° C. for 2 minutes to form a film.

A composition of the resist agent NPR9710 is as follows.
Propylene glycol monomethyl ether acetate: 50 to 80 mass %
Novolak Resin: 20 to 50 mass %
Sensitizer: less than 10 mass %

A surface of a silicon wafer, on which the carbon nanotube structure layer and the resist layer are formed, of the resist layer side was exposed using a mask aligner (mercury lamp MA-20, wavelength of 436 nm, manufactured by MIKASA Co., Ltd.) under the conditions of amount of light of 12.7 mW/cm$^2$ and 4 seconds in a shape of 500 μm×350 μm.

Further, the exposed silicon wafer was heated at 110° C. for 1 minute using a hot plate, cooled, and developed using tetramethylammonium hydroxide (NMD-3, 2.38 mass %, available from Tokyo Ohka Kogyo Co., Ltd.) as a developer and a developing machine (AD-1200, manufactured by Takizawa Sangyo YK).

The silicon wafer, on which the resist layer was formed in a prescribed pattern shape as described, was heated in a mixed gas (oxygen 10 ml/min, nitrogen 40 ml/min) at 200° C. and irradiated with an ultraviolet ray (172 nm) for 5 hours using a UV asher (excimer vacuum ultraviolet lamp, EXM-2100BM, wavelength of 172 nm, manufactured by ATOM-GIKEN Co., Ltd.) to generate oxygen radicals and remove a portion of the carbon nanotube structure layer not protected with the resist layer. Next, the resist layer, which remains as a top layer of the carbon nanotube structure layer was removed by washing with acetone. A resistance element having a thickness of 2 μm, a width of 350 μm, and a length of 500 μm was obtained from the above method. The resistivity of the resistance element was measured using a picoammeter (4140B, manufactured by Hewlett-Packard Company) and was confirmed to be 3.5 kΩ.

Example 10

[Thermistor]

A resistance element of MWNT-net (glycerin) (45 Ω, thickness (2 μm), width (80 μm), and length (500 μm)) and a resistance element of MWNT-net (hydroquinone) (3.5 kΩ, thickness (2 μm), width (350 μm), and length (500 μm)) were respectively prepared on SiO$_2$/Si substrates through a method described in Example 10

Figure 13:
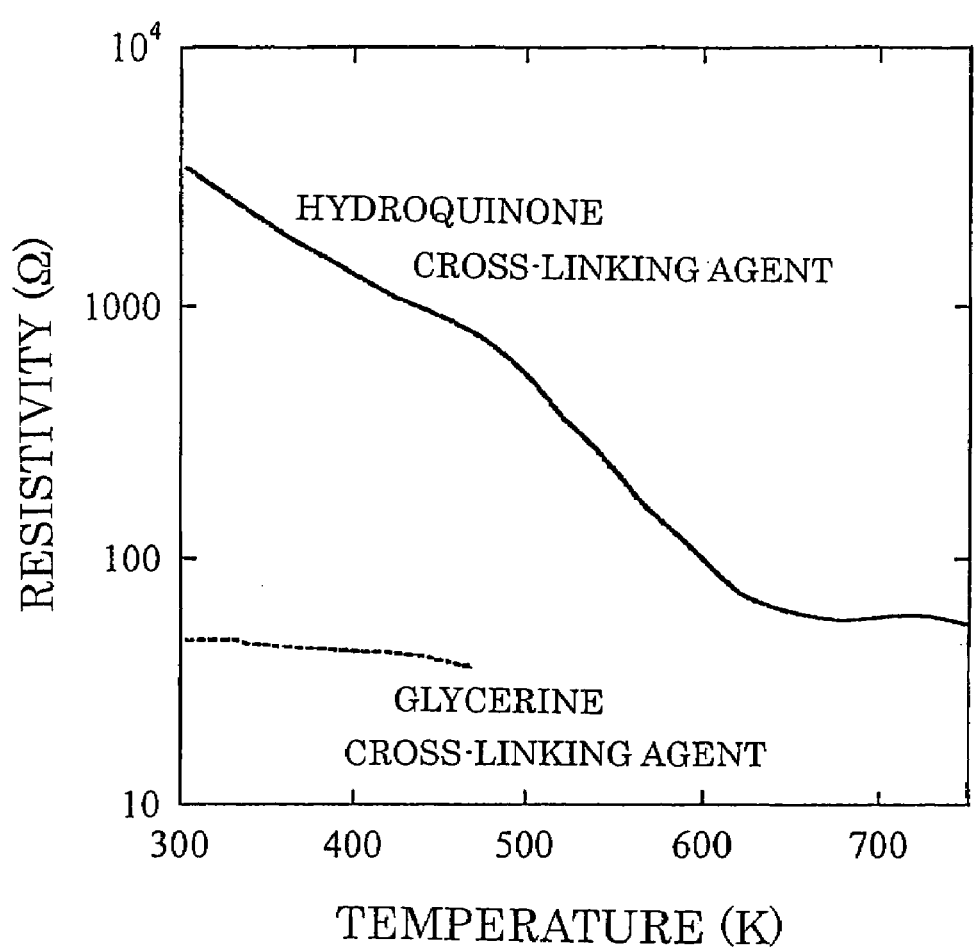
FIG. 13 shows a graph of a measurement result of an effect of a temperature change on a resistance value measured in Example 10.

An effect of temperature change on each of the resistivities was measured (using a measuring equipment prepared by combining a digital multimeter and a self-made high temperature electric furnace). As is shown in FIG. 13, the resistivity of the MWNT-net (hydroquinone) drastically decreases as the temperature rises, showing a temperature dependence of electrical resistivity. Therefore, it can be understood that the resistance element functions as an NTC thermistor. Further, the resistance element, which uses glycerin as a cross-linking agent, shows a temperature dependence of electrical resistivity, though the change rate is small. The resistance element can also be used as a thermistor according to kind of a power source and application.

The present invention as described above can provide a resistance element which shows a desired resistivity by changing the cross-linking molecule of the carbon nanotubes with a resistance element, which uses a coat having a mesh structure in which plural carbon nanotubes are cross-linked to one another. Further, a strong and flexible resistance element against deformation or stress can be provided because the carbon nanotubes are in the mesh structure. Further, a thermistor of a novel structure exhibiting similar effects can be provided.

What is claimed is:

1. A resistance element comprising an electrical resistance body consisting of a patterned carbon nanotube structure having a mesh structure, in which plural carbon nanotubes are cross-linked to one another through cross-linked sites.

2. A resistance element according to claim 1, wherein each of the cross-linked sites, where the plural carbon nanotubes are cross-linked to one another, has at least one chemical structure selected from the group consisting of —COO(CH$_2$)$_2$OCO—, —COOCH$_2$CHOHCH$_2$OCO—, —COOCH$_2$CH(OCO—)CH$_2$OH, —COOCH$_2$CH(OCO—)CH$_2$OCO, and —COO—C$_6$H$_4$—COO—.

3. A resistance element according to claim 2, wherein each of the cross-linked sites has a structure, in which plural functional groups are cross-linked together through a cross-linking agent in the liquid solution.

4. A resistance element according to claim 3, wherein the cross-linking agent is a not self-polymerizable cross-linking agent.

5. A resistance element according to claim 3, wherein:
each of the functional groups is at least one functional group selected from the group consisting of —OH, —COOH, —COOR (R is a substituted or unsubstituted hydrocarbon group), —COX (X is a halogen atom), —NH$_2$, and —NCO; and
the cross-linking agent is capable of prompting a cross-linking reaction with the selected functional groups.

6. A resistance element according to claim 5, wherein:
the cross-linking agent is at least one cross-linking agent selected from the group consisting of glycerin, ethylene glycol, butenediol, hexynediol, hydroquinone, and naphthalenediol; and
the functional groups are capable of prompting a cross-linking reaction with the selected cross-linking agent.

7. A resistance element according to claim 3, wherein:
each of the functional groups is at least one functional group selected from the group consisting of —OH, —COOH, —COOR (R is a substituted or unsubstituted hydrocarbon group), —COX (X is a halogen atom), —NH$_2$, and —NCO;
the cross-linking agent is at least one cross-linking agent selected from the group consisting of polyol, polyamine, polycarboxylic acid, polycarboxylate, polycarboxylic acid halide, polycarbodiimide, and polyisocyanate; and
the functional groups and the cross-linking agent are respectively selected for a combination capable of prompting a cross-linking reaction with one another.

8. A resistance element according to claim 3, wherein each of the functional groups is —COOR (R is a substituted or unsubstituted hydrocarbon group) and/or —COOH.

9. A resistance element according to claim 8, wherein the cross-linking agent is polyol.

10. A resistance element according to claim 9, wherein the cross-linking agent contains at least one cross-linking agent selected from the group consisting of glycerin, ethylene glycol, butenediol, hexynediol, hydroquinone, and naphthalenediol.

11. A resistance element according to claim 8, wherein the cross-linking agent is polyamine.

12. A resistance element according to claim 8, wherein the cross-linking agent is congo red.

13. A resistance element according to claim 8, wherein the cross-linking agent is an ammonium complex.

14. A resistance element according to claim 8, wherein the cross-linking agent is Cisplatin.

15. A resistance element according to claim 1, wherein the carbon nanotube structure comprises the cross-linked sites formed by:
curing a liquid solution containing plural carbon nanotubes that have plural functional groups bonded thereto; and
chemically bonding together the plural functional groups that have the carbon nanotubes connected thereto.

16. A resistance element according to claim 1, wherein the cross-linked sites are formed through chemical bonds of plural functional groups.

17. A resistance element according to claim 16, wherein a reaction forming the chemical bonds is at least one reaction selected from the group consisting of a dehydration condensation, a substitution reaction, an addition reaction, and an oxidative reaction.

18. A resistance element according to claim 16, wherein each of the cross-linked sites, where the plural carbon nanotubes are cross-linked to one another, has at least one chemical structure selected from the group consisting of —COOCO—, —O—, —NHCO—, —COO—, —NCH—, —NH—, —S—, —O—, —NHCOO—, and —S—S—.

19. A resistance element according to claim 16, wherein the plural functional groups react through a dehydration condensation to cross-link the carbon nanotubes.

20. A resistance element according to claim 19, wherein each of the functional groups is —COOH.

21. A resistance element according to claim 20, wherein each of the cross-linked sites, where the plural carbon nanotubes cross-link to one another, is —COOCO—.

22. A resistance element according to claim 1, wherein the plural carbon nanotubes are multi-wall carbon nanotubes.

\* \* \* \* \*